(12) United States Patent
Gilbert et al.

(10) Patent No.: US 10,636,389 B2
(45) Date of Patent: *Apr. 28, 2020

(54) ROTATIONAL DISPLAY SYSTEM

(71) Applicant: Spin Screen, Inc., Palm Beach Gardens, FL (US)

(72) Inventors: Mark D. Gilbert, Birmingham, AL (US); Paul Chen, Venice, CA (US); Lawrence Moens, Palm Beach, FL (US)

(73) Assignee: Spin Screen, Inc., Palm Beach Gardens, FL (US)

( * ) Notice: Subject to any disclaimer, the term of this patent is extended or adjusted under 35 U.S.C. 154(b) by 95 days.

This patent is subject to a terminal disclaimer.

(21) Appl. No.: 14/942,626

(22) Filed: Nov. 16, 2015

(65) Prior Publication Data

US 2016/0140936 A1 May 19, 2016

Related U.S. Application Data

(60) Division of application No. 13/778,970, filed on Feb. 27, 2013, now Pat. No. 9,190,028, which is a
(Continued)

(51) Int. Cl.
*G09G 5/36* (2006.01)
*B60Q 1/32* (2006.01)
(Continued)

(52) U.S. Cl.
CPC ............... *G09G 5/36* (2013.01); *B60K 35/00* (2013.01); *B60K 37/06* (2013.01); *B60Q 1/326* (2013.01); *B60R 13/00* (2013.01); *G06T 3/60* (2013.01); *G06T 15/00* (2013.01); *G09F 1/06* (2013.01); *G09F 9/33* (2013.01); *G09F 21/045* (2013.01); *G09G 3/005* (2013.01); *B60K 2370/143* (2019.05); *B60K 2370/1438* (2019.05); *B60K 2370/797* (2019.05); *B60Q 2900/30* (2013.01); *G09G 2340/0492* (2013.01); *G09G 2380/10* (2013.01)

(58) Field of Classification Search
None
See application file for complete search history.

(56) References Cited

U.S. PATENT DOCUMENTS 4,115,942 A 9/1978 Sears
4,338,547 A 7/1982 McCaslin
(Continued)

*Primary Examiner* — Benjamin C Lee
*Assistant Examiner* — Emily J Frank
(74) *Attorney, Agent, or Firm* — McHale & Slavin, P.A.

(57) ABSTRACT

The present invention provides a system which integrates unique lighting technologies, switching systems, mounting systems, information delivery systems and power supply systems within a support such as vehicular wheel to provide an advanced, high quality visual display apparatus in various surfaces of rotation. A displayed image may be three dimensional. These technologies, and their many unique applications, provide for a novel and useful series of video display devices that are small, lightweight, efficient and can have the capability of producing a clear, bright, high definition image that is equivalent to that of a modern day TV or high quality computer monitor.

35 Claims, 22 Drawing Sheets

Related U.S. Application Data continuation of application No. 12/646,422, filed on Dec. 23, 2009, now Pat. No. 8,411,108, which is a continuation-in-part of application No. 11/840,335, filed on Aug. 17, 2007, now Pat. No. 8,284,214, which is a continuation of application No. 11/187,625, filed on Jul. 21, 2005, now Pat. No. 7,271,813.

(60) Provisional application No. 60/589,651, filed on Jul. 21, 2004.

(51) Int. Cl.

| | | |
|---|---|---|
| *B60R 13/00* | (2006.01) | |
| *G06T 15/00* | (2011.01) | |
| *G06T 3/60* | (2006.01) | |
| *B60K 35/00* | (2006.01) | |
| *B60K 37/06* | (2006.01) | |
| *G09F 1/06* | (2006.01) | |
| *G09F 9/33* | (2006.01) | |
| *G09F 21/04* | (2006.01) | |
| *G09G 3/00* | (2006.01) | |

(56) References Cited

U.S. PATENT DOCUMENTS

| | | |
|---|---|---|
| 4,631,848 A | 12/1986 | Iwasa et al. |
| 5,057,827 A | 10/1991 | Nobile et al. |
| 5,290,094 A | 3/1994 | Gragg |
| 6,037,876 A | 3/2000 | Crouch |
| 6,072,386 A | 6/2000 | Yu |
| 6,492,963 B1 * | 12/2002 | Hoch ............... B62J 6/20 340/432 |
| 6,575,585 B2 | 6/2003 | Nelson et al. |
| 6,663,187 B2 | 12/2003 | Fitzgerald |
| 6,856,303 B2 | 2/2005 | Kowalewski |
| 7,046,131 B2 | 5/2006 | Todorox |
| 7,079,042 B2 | 7/2006 | Reim |
| 7,099,701 B2 | 8/2006 | Lo et al. |
| 7,161,256 B2 | 1/2007 | Fang |
| 7,271,813 B2 | 9/2007 | Gilbert |
| 7,417,555 B2 | 8/2008 | Chivarov et al. |
| 7,477,208 B2 | 1/2009 | Matlock et al. |
| 8,411,108 B2 * | 4/2013 | Gilbert ............... B60K 35/00 345/619 |
| 2002/0005826 A1 * | 1/2002 | Pederson ............ B60Q 1/2611 345/82 |
| 2002/0126119 A1 * | 9/2002 | Tashman ........... G02B 27/2271 345/426 |
| 2002/0133282 A1 | 9/2002 | Ryan et al. |
| 2002/0135541 A1 | 9/2002 | Kowalewski |
| 2002/0163792 A1 * | 11/2002 | Formoso ............... F21K 2/06 362/34 |
| 2004/0102223 A1 | 5/2004 | Lo et al. |
| 2004/0105256 A1 | 6/2004 | Jones |
| 2004/0183696 A1 | 9/2004 | Low |
| 2005/0174308 A1 * | 8/2005 | Matlock ............... G09G 3/005 345/82 |
| 2010/0033945 A1 * | 2/2010 | Huang ................ B60Q 1/326 362/35 |

* cited by examiner

ROTATIONAL DISPLAY SYSTEM

RELATED APPLICATIONS

In accordance with 37 C.F.R 1.76, a claim of priority is included in an Application Data Sheet filed concurrently herewith. Accordingly, the present invention claims priority under 35 U.S.C. § 119(e), 120, 121, and/or 365(c) as a divisional to U.S. patent application Ser. No. 13/778,970, filed Feb. 27, 2013, entitled, "Rotational Display System", which is a continuation to U.S. patent application Ser. No. 12/646,422, filed Dec. 23, 2009, entitled, "Rotational Display System", now U.S. Pat. No. 8,411,108, issued Apr. 2, 2013, which is a continuation-in-part of U.S. patent application Ser. No. 11/840,335, filed Aug. 17, 2007, entitled, "Rotational Display System", now U.S. Pat. No. 8,284,214, issued Oct. 9, 2012, which is a continuation of U.S. patent application Ser. No. 11/187,625, filed Jul. 21, 2005, entitled, "Rotational Display System", now U.S. Pat. No. 7,271,813, issued Sep. 18, 2007, which claims priority under 35 USC 119(e) to the U.S. Provisional Patent Application No. 60/589,651, filed Jul. 21, 2004, entitled, "Rotational Image Display Systems With Related Applications And Methods," the entire disclosures of which are incorporated herein by reference.

FIELD OF THE INVENTION

This invention relates generally to lighting systems including automotive lighting systems. More specifically, the present invention relates to the display of visual images and/or display of visual information such as pictures, text and full motion video sequences on the rotating wheels of a vehicle and other display devices.

BACKGROUND OF THE INVENTION

Numerous systems for producing visual images and displaying visual information such as pictures, text and full motion video sequences were developed over a century ago. One such technology developed utilizes rotating assemblies having intermittently illuminated elements to produce text or basic shapes. The rotation, combined with rapidly changing illuminated segments produces a series of flashing frames that blend to form a recognizable image, or series of images. This effect is broadly known as persistence of vision and is more specifically referred to as "scanning". In modern devices that utilize persistence of vision technology, electronic information about an image to be displayed is used to synchronize the illumination of individual illuminating elements at specific positions during the rotation.

There are generally two types of persistence of vision displays currently known in the art; cylindrical and planar. A cylindrical display rotates an LED display in a manner that creates images in a cylindrical manner, as if the images were on the side of a soda can. A planar display rotates the LEDs so that they appear in a flat disk shaped area. Within the planar display, small bright illuminating elements are typically arranged along an elongated flat member. An axle is positioned at about the mid-point of the flat member, similar to an airplane propeller, and a motor is provided to rotate the member at a relatively high speed. As the flat member rotates, the blur perceived by the eye makes the rotating member appear to be a flat circle. This virtual circle formed by the spinning member forms a visual image when color, brightness and timing of the illuminating sections on the member are properly synchronized.

One of the earliest examples of image producing systems that utilized a rotating member, a series of illuminating devices and a system of synchronizing to display an image was developed and patented by Paul Gottlieb Nipkow from Germany. Nipkows' system of receiving and reproducing images utilized a selenium photocell and a (rotating) scanning disk. In order to capture an image, his early (1884) system employed a scanning disk with a single row of holes arranged so they spiraled inward toward the center of the circle. The disk revolved in front of a light sensitive plate on which a lens formed an image. Each hole passed across, or "scanned" a ring shaped portion of the image. The holes traced contiguous concentric circles so that in one revolution of the disk, the entire image was scanned, converting a visible image to a series of electrical signals. A similar rotating disk system was used to reproduce the image that had been scanned. By rapidly switching a series of lights aligned with the holes in the rotating disk, synchronized illumination passed through holes tracing an image with many concentric circles of light.

Similar systems that followed Nipkow's original designs include developments by J. L. Baird in England and F. Jenkins in the United States, both of whom successfully demonstrated television systems using scanning disks in 1926. Such systems produced 60 to 100 scanned lines to provide recognizable black and white images that were high quality by 1926 standards.

Research and development of video display systems that employed rotating mechanical scanning came to a stop after the nearly simultaneous invention of electronic scanning systems by Philo T. Farnsworth in 1927 and by Vladimir K. Zworykin in 1928. Both the Farnsworth and the Zworykin systems of the mid and late 1920's scanned an electron beam back and forth across the inside of a glass cathode ray tube, striking a phosphorescent surface plane, causing images to appear on a glass picture tube. The electronic scanning picture tube designs developed by both inventors became the foundations for the cathode ray tube that was further perfected and marketed in the first home television receivers. Significant picture tube improvements were developed by Allen B. DuMont who increased the reliability, quality and display size of picture tubes during the 1930's. The same electron scanning technology has evolved into the high quality glass picture tubes that are still found in present day color (picture tube type) televisions and computer monitors.

The aforementioned inception of electronic picture tubes during the late 1920's effectively signaled the end of mechanical rotating image display systems by the 1930's. Early picture tubes were essentially sealed, low maintenance systems with no mechanical components. Such improvements rendered rotary image display systems obsolete. The illumination systems, propulsion means, synchronization circuits and power requirements of rotary mechanical visual display systems made them heavy, bulky, inefficient, unreliable and of marginal value due to low video quality when compared to cathode ray tube visual displays. Thus, cathode ray tubes became the industry standard by the 1930's. Consequently, rotational scanning technology as a means of image display had largely been forgotten until very recently with the implementation of a few new products, and with the new technology disclosed herein. Several recent products employ new uses and variations thereof based on illuminated rotational scanning display systems. Likewise, these newer developments define a group of prior art that are related to the new and useful invention described herein.

One such prior art development is presented in U.S. Publication No. 2004/0102223 to Lo. Lo describes a rotating LED device that receives data by infrared transmission and then displays such data by synchronizing the illumination display of a row of rotating LEDs. The device is specifically embodied as both a functional and ornamental device that is used to display incoming telephone caller numbers as a caller ID apparatus, and further displays other alpha-numeric information such as the time, date and a few pre-programmed seasonal greetings that are stored in the unit's internal memory. Since the rotating member containing the LED array must synchronize the display of information as rapidly as it rotates, Lo describes a system that transmits infrared signals to a rotating illuminating member, from an infrared transmitter located in the stationary base unit. This effectively separates the actual rotating member and LED array from its support circuits that need not rotate in order to produce a visual image. The infrared system described provides a wireless path by which information to be displayed is beamed directly to a small infrared receiver that is part of the rotating display system. This design minimizes the amount of parts that must rotate, thus minimizing rotational mass, minimizing the weight of moving parts. However, because the device derives both a positional reference point and data concurrently as a predetermined point on the rotating arm passes the infrared sender, the amount of data that can be transferred is very limited.

Thus, Lo's device is limited to displaying alpha-numeric data, caller ID information, clock settings and a series of pre-determined greetings through a telephone interface. Lo's design does not disclose hardware, systems, methods or other provisions capable of providing motion picture sequences that are user selected, or supplied through an external source such as a digital media system, DVD, hard drive or other data storage device. Moreover, like the other existing prior art, the system is monochromatic, and thus has support circuitry that limits data and image display throughput to the monochromatic color output of the included display devices. Even if the LED array disclosed on the device were made multi colored for ornamental purposes, the internal processing system is only designed to synchronize the on/off LED array switching to display alpha numeric data and a few low resolution symbols. Thus, its hardware and software cannot support streaming color video to display life like color images or color full motion video since the system is not wired and programmed to support true color synchronized switching or related data throughput.

Another spinning illuminated novelty device with synchronized light sources is described in U.S. Pat. No. 6,575,585 to Nelson, et al. This system is essentially a small, portable, battery operated amusement device that spins an array of lights. A small control circuit is located on the rotating member, proximal to the light array. The control circuit contains predetermined embedded ornamental patterns that cause the light array to illuminate in a predetermined pattern, synchronous to their speed. This causes an ornamental lighted display of shapes, colors, images or text to appear, depending on the predetermined pattern data integral to the control circuit. The embodiment shown uses a rotating contact system, such as a slip-ring style contact, to directly energize a control circuit and lights on the moving blades. This allows the stationary battery pack to directly connect its power wires to the illumination system and illumination control circuit on the moving rotor.

Because the system described by Chernick is primarily designed to be a very affordable children's toy, it is not capable of the advanced requirements necessary to display true color synchronized switching. The control circuit described is primarily a low cost pre-programmed device that displays a few visual patterns of varying colors. User selectability of pre-programmed patterns is not present, to keep production cost low, and minimize user interface parts. Therefore, upon turning the toy on, illumination patterns are generated by the digital controller in a predetermined manner. The user does not select from predetermined groups of images or messages to be displayed. Thus, the preferred embodiment shows only a simple on/off hardwired switch as the only human interface device present.

U.S. Publication No. 2004/0105256 to Jones discloses virtual color generating windmills, decorative spinners, and ornamental devices powered by solar or wind energy. Although very similar in ornamental value to the above mentioned illuminating toy by Chernick, the windmills disclosed by Jones utilize wind or solar energy to power integrated illumination systems that add to the visual interest of the windmill or similar outdoor ornament. In operation, as the windmill turns, sets of small LEDs scan rotational patterns of light creating an ornamental effect. While this system employs rotational scanning, images displayed contain little or no parameters for user selectability, and are incapable of displaying life like color images or color full motion video. Another device which employs rotational image display is the I-Top, a small, portable device for gaming and amusement. The I-Top by Irwin Toys (I-Toys) is a pocket sized, battery operated spinning top with an integrated array of 8 LEDs. Using a button switch on the I-top, a user can select from a series of pre-programmed games that are integral to the unit's controller. Once the user selects a game, then spins the I-Top, the toy displays scores, messages and animations through its array of LEDs that form a virtual screen while spinning. A stable display image is accomplished by using a built in magnetic compass that always knows the instantaneous position of the top, and synchronizes the illumination display output flashes for each LED accordingly based on rotational position.

Due to the compass based position sensor disposed inside the I-Top, the beginning point of any chain of words on the I-Top is always pointing to Earth's magnetic North. Hence, magnetic north is used as a reference for the LED synchronization, and to calibrate in which direction or position the output text should appear.

While compass based positional synchronization works very well for devices which rotate in a horizontal plane, a traditional compass based system will not provide adequate positional synchronization for devices which rotate in vertical or near vertical planes. The internal compass can become confused if the azimuth or angular orientation of its intended operational plane is shifted to a degree at which it cannot properly track the Earth's magnetic field. In addition, proximity to various metals, magnetic fields, and radio frequency interference from cellular phones, vehicle electronics and other high frequency sources also interferes with compass function via direct magnetic field distortion or by subsequent inductive jamming of sensitive compass support circuitry. This confuses positional synchronization, and thus would corrupt and distort the images output on the illuminated array, making the device unsuitable for use in conjunction with vehicles and/or vehicle wheels.

Other devices which utilize scanning technology may be found on the internet. These devices are commonly known online as "propeller clocks." The name "propeller clock" is a slang term that describes many persistence of vision displays that arose as a niche hobby after Robert Blick created what is presumed to be the first persistence of vision LED display that displayed a clock face. The clock was comprised of a rotating LED array that spun much like an airplane propeller, thus initiating the term "propeller clock" that has become a generic name for many similar rotationally scanned devices. More specifically, most of these devices take the form of a rotating array of LEDs, a motor system to power the rotation, a system of delivering power to the motor and rotating LEDs, and a system to synchronously energize the LEDs, thus allowing the rotating array to visually display one or more desirable patterns.

In general, this body of prior art addresses and solves some of the technical challenges that surround all rotational displays. These technical challenges include construction of rotating displays, selection of appropriate high brightness LEDs for monochromatic displays, proper balance and vibration control of rotating displays, methods of delivering reliable electrical power to the rotating portion of displays, methods and hardware for position sensing on the display, data delivery for displaying images on rotating arrays, programmable integrated circuit (PIC) programming and related costs.

While all of the prior art devices are capable of providing relatively simple displays, none of the prior art devices are capable of providing true color or streaming video. In addition, all of the prior art devices display images directly from their plane of rotation. That is, the devices twist the (normally horizontal) ground plane of the image or text around the axis of rotation causing, text, numbers and animations to be displayed and scrolled in a circular pattern along an artificial bottom line. This causes the user to read text that bends around the circle of rotation, as opposed to across the circle of rotation. This design feature is common to the prior art and is a result of a not defining a real horizontal reference within the actual programming code, data processes and internal feedback loops that process and ultimately synchronize output data to illuminate sections of a rotational display. Not defining a real visual ground plane reference for display purposes, and further not correlating a visual display ground plane with the horizon or actual ground, eliminates related programming complexities and internal algorithms. The non-presence of this feature in the prior art allows for the use of a simple, low cost microprocessor controllers with limited complexity. However, the devices can be difficult to read and render the possibility of full motion video displays across the entire virtual disk impossible.

Still yet, the geometry of all prior planar display devices has some object or component mounted at the center of the circle of rotation that blocks the presence of illuminating elements. Thus, the total display area that could potentially produce an illuminated image is hindered by a "hole" or circular blank spot at the middle of the circle. This geometric limitation, which also applies to and is later addressed by the invention disclosed herein, provides another reason why text and images are displayed in a manner to twist around the center of rotation. Simply put, if the center does not have illumination hardware, any image programmed to intersect the center of the circle would not display properly.

This same limitation also affected the quality of early scanning image systems, like those of Nipkow and Baird. It is also of importance to mention that the aforementioned display systems of the late 1800s and early 1900s, in many cases, did not utilize the full optical range of their scanning disks for this very reason. Instead, a dark colored shield would cover most of the scanning disk displays, and a small window cut in the shield would usually frame a small area toward the outside of the disk, where linear scanning velocities were the greatest. Through the window, a small portion of the scanning disk was visible, and the image or television program was synchronized to appear in this window. The dark colored shield that covered the majority of the scanning disk essentially prevented the observer from viewing areas that were optically distorted or incapable of displaying visual imagery, as was the axis of rotation and the areas proximal thereto.

Further yet, the prior art does not disclose or suggest a rotational display device which operates in conjunction with a motor vehicle. Nor does the prior art disclose any of the numerous variations and enhancements to wheel mounted display systems that are described herein in regards to the present invention.

Accordingly, it is a primary objective of the instant invention to provide a high quality rotational display apparatus in combination with a display device such as a vehicular wheel to provide ornamental and functional displays.

It is a further objective of the instant invention to provide a rotational display apparatus having the capability of producing a true color images that are substantially equivalent to that of a modern day TV or high quality computer monitor.

It is yet another objective of the instant invention to provide a rotational display apparatus that is capable of displaying both cylindrical and planar type displays in a single apparatus.

It is a still further objective of the instant invention to provide a rotational display apparatus which extends the illuminating elements to the center of the display device such as a wheel to allow center-crossing of images.

Still yet another objective of the instant invention is to provide a rotational display apparatus in combination with a vehicular wheel capable of displaying text and images across a linear bottom line.

Yet another objective of the instant invention is to provide a rotational display apparatus in combination with a display device such as a vehicular wheel capable of providing virtual headlight, tail light, brake light, and directional signals.

Accordingly, it is a primary objective of the instant invention to provide a panel display device such as a fold out communication device with a rotational scanning display apparatus to provide message communication and image displays.

It is a further objective of the instant invention to provide a panel display device having the capability of producing a true color scanned images.

It is a still further objective of the instant invention to provide a panel display device which extends the illuminating elements to allow center-crossing of images.

It is a still further objective of the instant invention to provide a display device with a rotational scanning display apparatus to provide message communication and image displays in three dimensions.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

SUMMARY

The present invention provides a system which integrates unique lighting technologies, switching systems, mounting systems, information delivery systems and power supply systems to provide a display device such as a vehicular wheel, greeting card and popup book to provide an advanced, high quality visual display apparatus. These technologies, and their many unique applications, provide for a novel and useful series of video display devices that are small, lightweight, efficient and have the capability of producing a clear, bright, high definition image that is equivalent to that of a modern day TV or high quality computer monitor. Further applications of the disclosed technologies allow the installation of compact rotary video displays in numerous applications where rotary display devices are equipped with the disclosed technologies to display visual images, videos and text while rotating. The compact, energy efficient, high optical quality technology disclosed herein is relatively inexpensive to mass produce and can be applied to many unusual locations. The primary application for rotational scanning systems discussed herein is an electronically controlled display system disposed upon or made integral to a motor vehicle wheel with both ornamental and functional applications. The compact, energy efficient, high optical quality technology disclosed herein is relatively inexpensive to mass produce and can be applied to many forms of display devices such as vehicle wheels, greeting cards, popup books, regular books, magazines and the like.

The system is preferably configured for connection to display information from a portable or stationary computing device that includes hardware and/or software, to provide, import, manipulate, store and selectively display visual information of the user's choice. Such devices may include, but should not be limited to, palm sized computing devices, portable video game systems, laptop computers, cellular phones, audio systems, navigation systems, vehicle electronics, mobile video systems, multi-function displays or other devices that typically employ a visual display.

The computing device transfers information regarding the data to be displayed to a rotatable assembly which includes a controller and an illuminating assembly. The illuminating assembly includes a plurality of illuminating elements. The illuminating elements are synchronized by the controller to light-up specific elements of the assembly at specific times and/or positions during rotation. This causes the rotatable assembly to display predetermined image(s), text, animations or other visual information that is pre-loaded, programmed or otherwise provided to the controller from the computing device.

One embodiment of the device combines multiple synchronized illuminating assemblies that share a common axis of rotation, but are positioned at different angles with respect to the axis, to provide more than one image plane or more than one angle or set of angles for light emission direction. Such an arrangement, when synchronized to minimize interference and separate images in a predetermined sequence, provides a three dimensional image. The device may also provide a drive to move illuminating assemblies about multiple axes of rotation to provide a three dimensional image.

In further embodiments the instant invention may be utilized for use as a display system in rough service environments such as on helicopter main blades, tail rotors, impellers, turbines, machine tools or rotating components in manufacturing systems and engines.

The system is preferably configured for connection to receive image display information from a portable or stationary computing device that includes hardware and/or software, to provide, import, manipulate, store and selectively display visual information of the user's choice. Such computing devices may include, but should not be limited to, palm sized computing devices, portable video game systems, laptop computers, cellular phones, audio systems, navigation systems, vehicle electronics, mobile video systems, multi-function displays or other devices that typically employ a visual display. The user may effect the data transfer or a sales person at a store may effect the data transfer to provide a personalized message in the displayed image(s).

The computing device transfers information regarding the data to be displayed to a rotatable assembly which includes a controller and an illuminating assembly. The illuminating assembly includes a plurality of illuminating elements. The illuminating elements are synchronized by the controller to light-up specific elements of the assembly at specific times and/or positions during rotation. This causes the rotatable assembly to display predetermined image(s), text, animations or other visual information that is pre-loaded, programmed or otherwise provided to the controller from the computing device.

One embodiment of the device combines multiple synchronized illuminating assemblies that share a common axis of rotation, but are positioned at different angles with respect to the axis, to provide more than one image plane or more than one angle or set of angles for light emission direction. Such an arrangement, when synchronized to minimize interference and separate images in a predetermined sequence, provides a three dimensional image.

The invention also involves the provision of a persistence of vision system capable of producing a three dimensional image that can be either still or animated. It can utilize an illumination assembly that will move about a plurality of different axes of rotation.

The invention further involves the provision of a vision system that can be used in a panel type device, such as a greeting card, picture frame or popup book to display a planar or cylindrical image. The vision system may also have an illumination assembly configured to produce a three dimensional image.

BRIEF DESCRIPTION OF THE FIGURES

Like numbers used throughout the figures represent like and or similar parts and/or construction.

DETAILED DESCRIPTION

Figure 1:
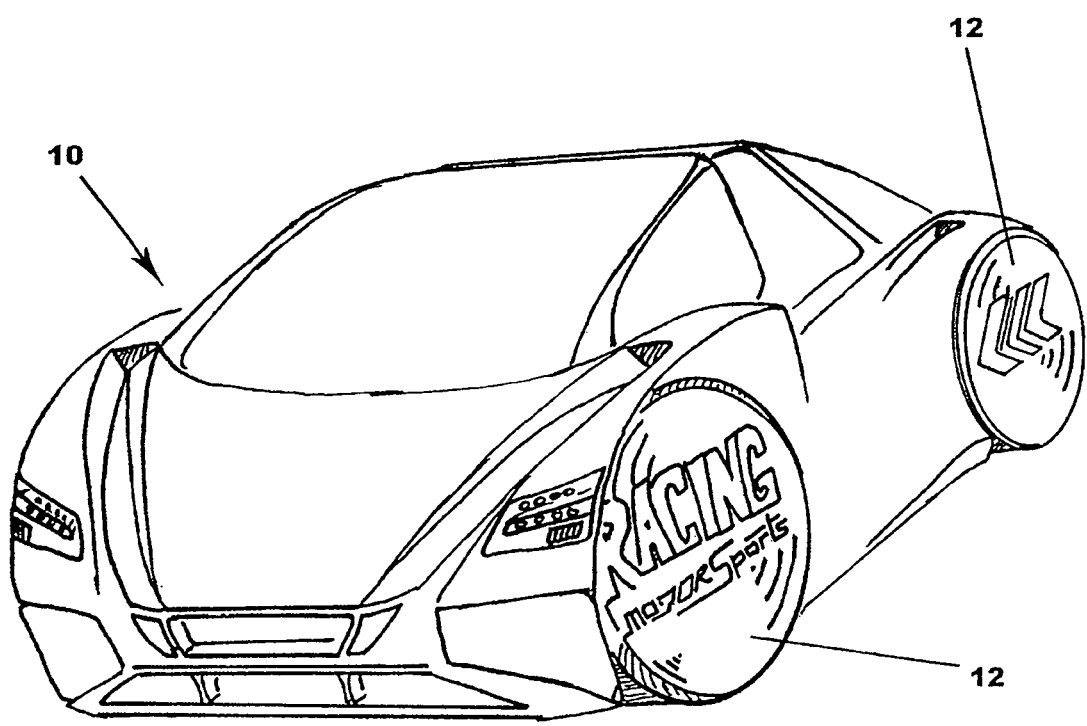
FIG. 1 is a perspective view of a vehicle illustrating the instant invention in operation upon a rotating motor vehicle wheel.
Figure 2:
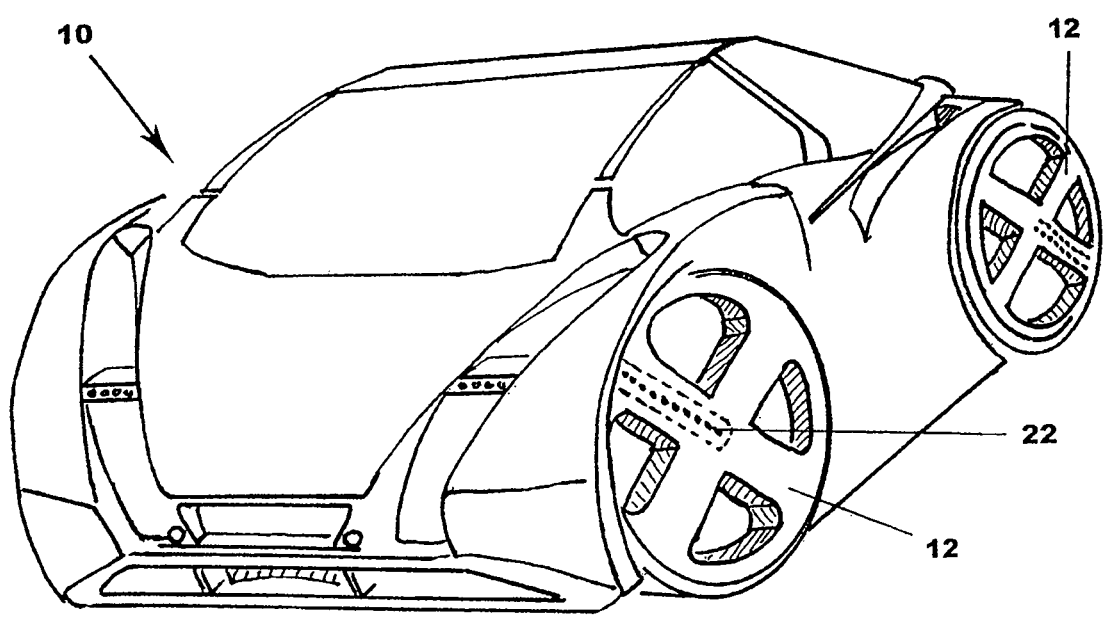
FIG. 2 is a perspective view of the vehicle shown in FIG. 1 illustrating one embodiment of the instant invention utilizing an LED illuminating assembly in conjunction with a motor vehicle wheel.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Referring to FIGS. 1-10, various embodiments of the instant invention are illustrated as being incorporated into the wheels of a motor vehicle 10. In general, the disclosed systems are rotational display systems 12 that display user selectable visual information such as images, text, numbers, symbols, animations, videos and the like upon the wheel of a vehicle during rotation thereof. It is important to note that the component description below is a general way to explain the system and its' basic components. Given modern technology, many or all of the components could be combined or split in many ways and thus should not be limited to the specific component descriptions included herein. The general components of the system include a computer 14, a rotatable assembly 24, and a means of power delivery 20 to the rotatable assembly.

Figure 5:
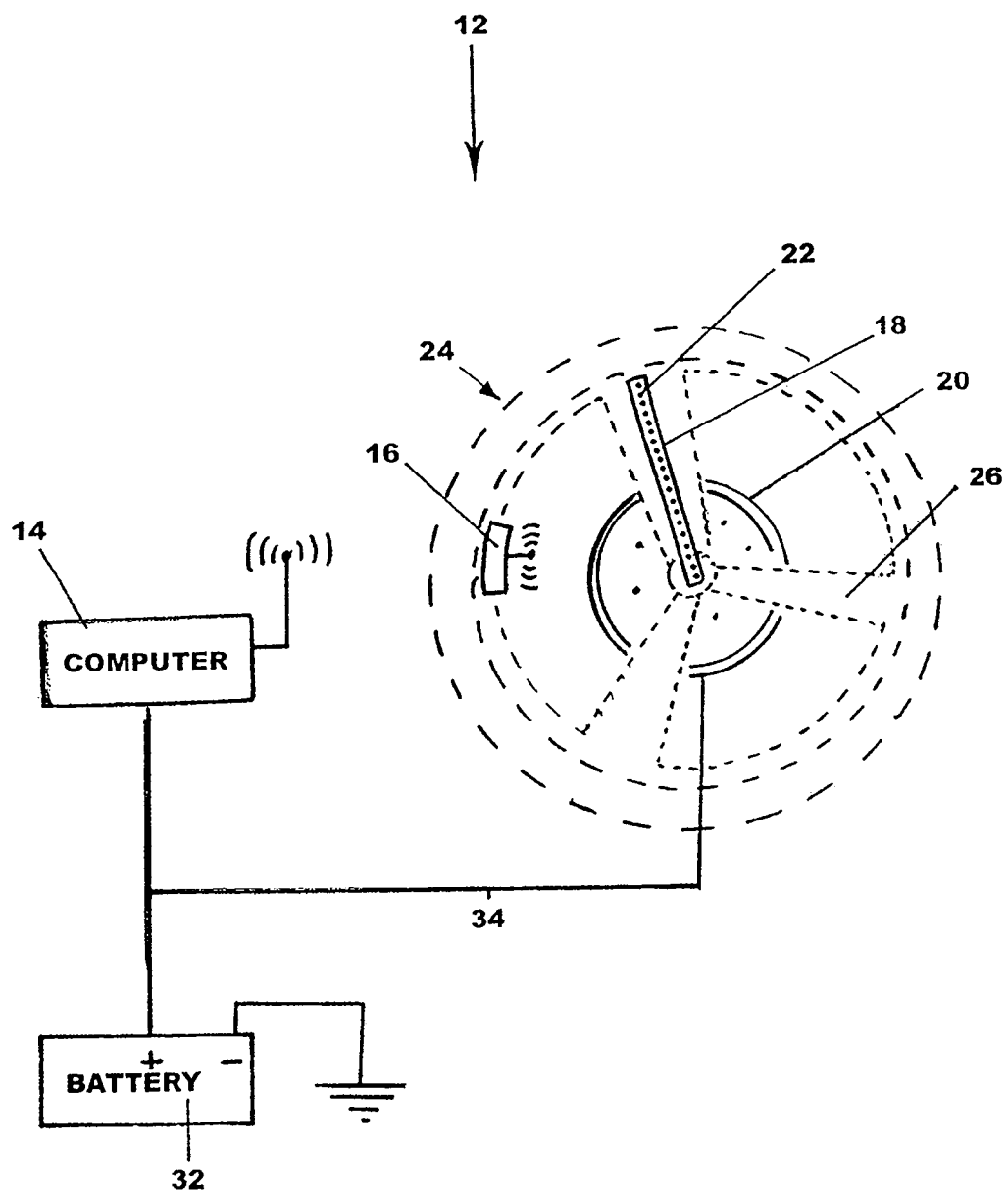
FIG. 5 is a schematic of one embodiment of the instant invention.
Figure 6:
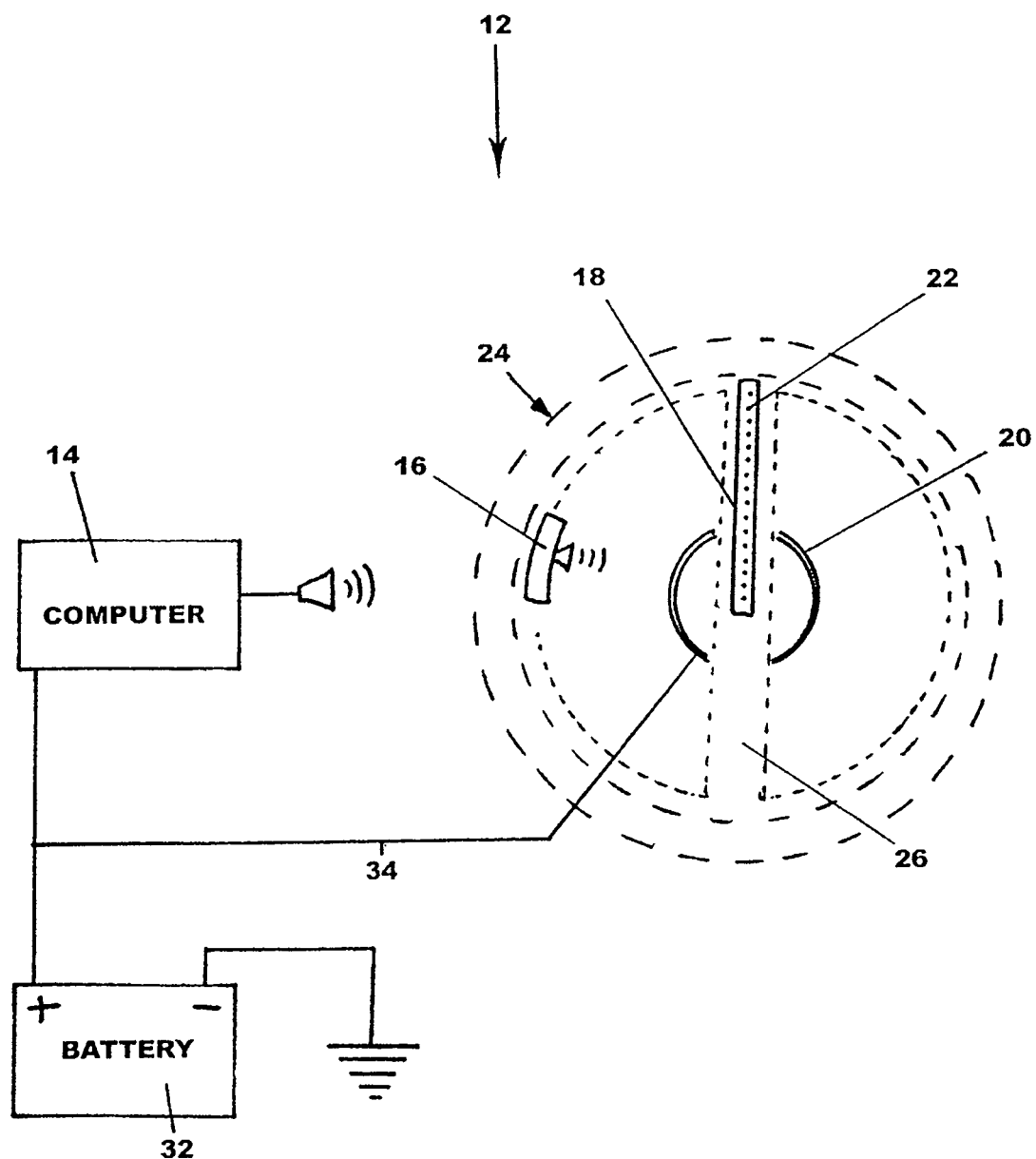
FIG. 6 is a schematic of one embodiment of the instant invention.
Figure 7:
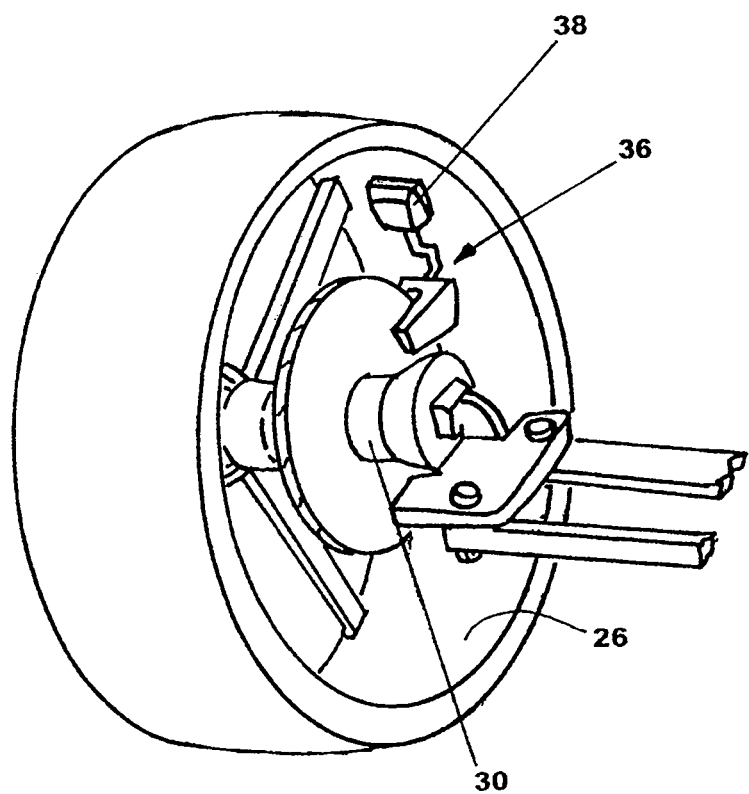
FIG. 7 is a partial perspective view illustrating one means for delivering power to the rotatable assembly.
Figure 8:
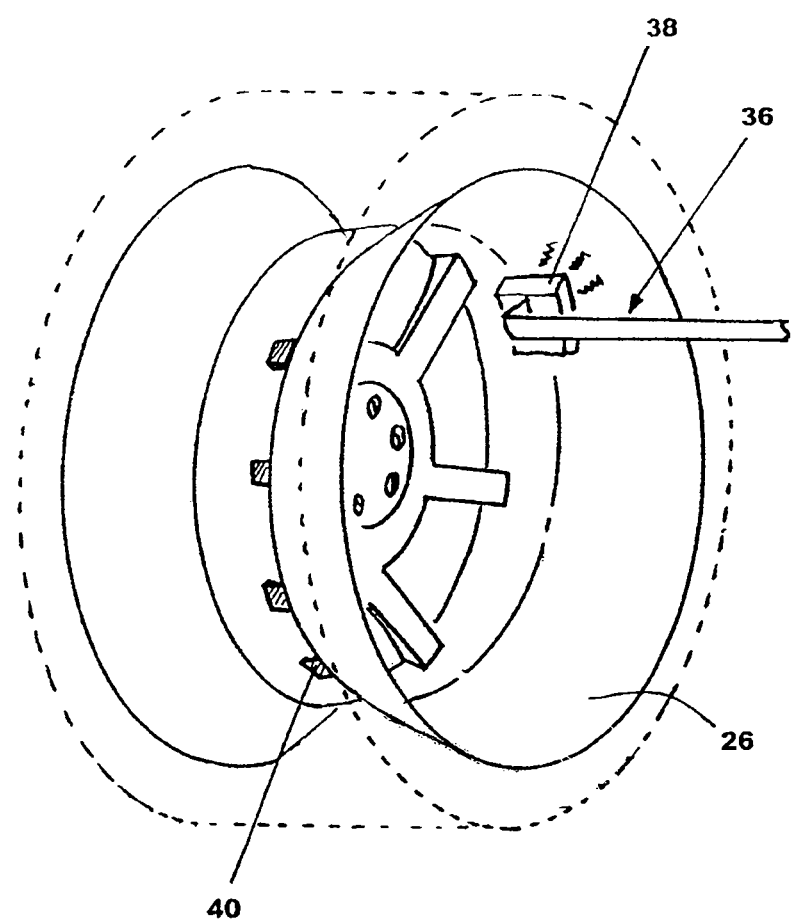
FIG. 8 is a partial perspective view illustrating one means for delivering power to the rotatable assembly.
Figure 9:
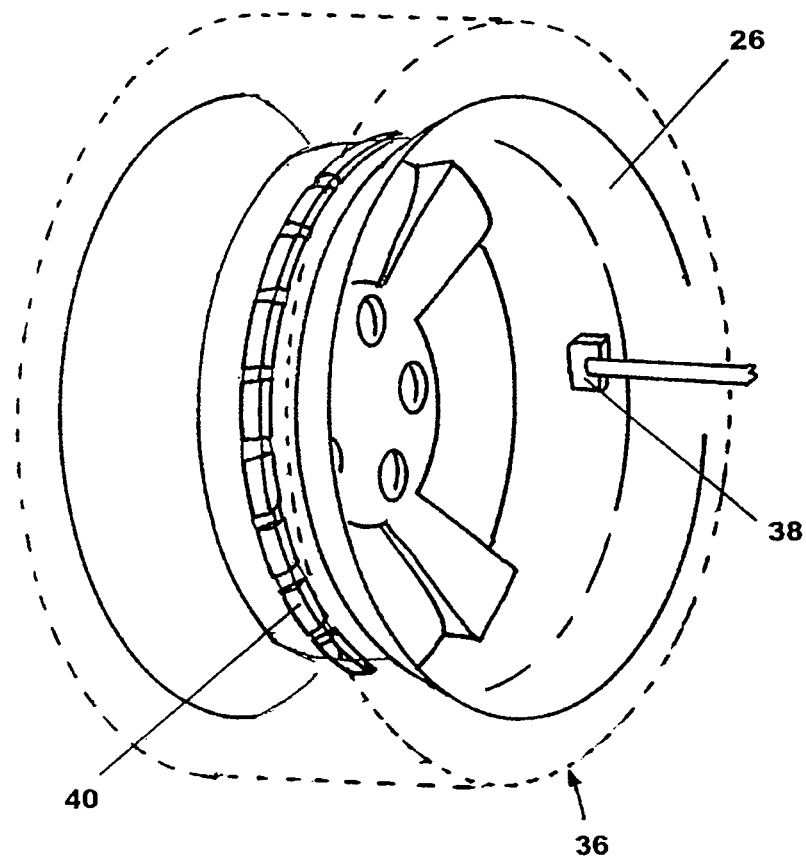
FIG. 9 is a partial perspective view illustrating one means for delivering power to the rotatable assembly.

The computer 14 provides for storage and recall of images which are wirelessly transferred to the rotatable assembly 24 which includes a controller 16 and an illuminating assembly 18 (FIGS. 5-6). The computer 14 is a microprocessor type device that allows users to upload and store images, videos, logos, text, and the like by accepting various software file formats which may include, but should not be limited to: JPEG, BMP, AVI, Quicktime and the like. The computer may also accept popular hardware methods of transferring stored digital information which may include, but should not be limited to: CDs, DVDs, various flash memory cards, USB ports, wireless connections, optical connections, IR ports and the like. The computer provides a high level of user selectivity and may include enhancements such as touch screens, digital pads, keyboards and suitable combinations thereof, all well known in the art, which allow a user to select which images or videos should be displayed on the rotational display system 12 during operation thereof.

The computer 14 electrically communicates with the rotatable assembly via the controller 16. The controller is preferably positioned within the rotatable assembly, illustrated herein as a motor vehicle wheel 26. The controller includes circuitry suitable to accept communications from the computer via radio, as shown in FIG. 5 or optical transmission, as shown in FIG. 6. A most preferred embodiment utilizes wireless micro transmitters and receivers, these devices are readily available from Freescale Semiconductor Inc. Of Austin, Tex. and include integrated circuits that can at least receive data from the computer as may be utilized to provide two-way communication between the computer and the receiver. The controller also includes circuitry capable of synchronously illuminating the illuminating elements 22 of the illuminating assembly 18, thus producing a visual output. The specific hardware and/or software utilized within the controller will vary based upon the type, size and quantity of illuminating elements, as well as the rotational speed of the rotatable assembly, and the complexity of text, numbers, images or animations to be displayed through the rotatable assembly 18. The primary job of the controller is to receive information regarding the desired display from the computer and synchronously energize individual illuminating elements, clusters or pixels within the illuminating assembly 18 to produce one or more predetermined images. In order to properly synchronize the illuminating elements 22 for illumination at specific positions within the rotation of the illuminating assembly 18, the controller must know its position with respect to a predetermined point within the rotation. Thus, the controller 16 includes a means of synchronization that perceives the passing of one or more positions during rotation of the rotatable assembly 24. The simplicity, complexity or overall effectiveness of any position sensing apparatus within the controller may vary depending on the application. Examples of readily available position sensing devices include, but should not be limited to: gyroscopes, magnetic sensors, Hall Effect sensors, lasers, infrared devices, radio-frequency devices, optical/reflective tachometers, laser tachometers, mechanical position (rotary) encoders, electromagnetic sensors, accelerometers, displacement sensors and suitable combinations thereof. In addition, Programmable Logic Control "PLC" technologies from various industrial automation systems, machinery and robotics utilize numerous varieties of advanced, miniature, rugged, programmable position sensing systems. These PLC position sensing systems and components have become standard, low cost, readily available and highly reliable within industrial automation and manufacturing technologies. Many miniature PLC components now feature sophisticated integrated memory and internal computing power sufficient to integrate many functions such as computing, control, sensing, feedback, programming and visual display output on one single compact rugged electrical device that can be programmed for unique applications. Computer Programmable Logic Devices (CPLDs) and Field Programmable Gate Arrays (FPGAs) such as those offered by Xilink and Altera semiconductor companies, both of San Jose, Calif., can be employed as sophisticated multi-input PLC position sensing and control systems. Similar miniature electronic hardware devices such as micro-scale radio transmitters like those offered by Analog Devices Inc of Norwood, Mass., coupled with miniature multi-axis position sensors such as those offered by Honeywell SSEC of Plymouth, Minn. allow a suitable PLC system to utilize wireless technologies for the acquisition, processing and sharing of position sensing data within a rotational display system. Various PLC systems and components provide yet another option for reliable rotational display synchronization hardware that are rugged and designed to operate in a variety of physically and electrically demanding environments such as within the wheel of a motor vehicle. Such systems and associated sub components are available from Omron of Kyoto, Japan and Silicon Laboratories of Austin, Tex.

The illuminating assembly 18 can have numerous inherent variations in size, length and resolution (resolution or definition is the number of actively switchable or addressable illuminating elements per unit of area; the higher number indicates that a higher quality image can be displayed). The illuminating assembly can also be made from many different illuminating elements which may include, but should not be limited to: light emitting diodes (LEDs), organic light emitting diodes (OLEDs), electroluminescent strips (ELs), liquid crystal displays (LCDs), thin film transistor liquid crystal displays (TFTs), plasma displays, small light bulbs or suitable combinations thereof, and may be used to form an appropriate display for predetermined applications. Regardless of the type of light generating instruments or apparatus used, individual elements of the illuminating assembly must be controllable to appropriately illuminate at predetermined positions during rotation, thus forming a predetermined image. Each choice of illuminating element has different characteristics, advantages and disadvantages. LEDs for example, are bright, efficient and durable, and can be surface mounted on a thin PC board with supporting electronic subsystems, all at a very low cost. A strip of color LCDs, such as the material used on laptop computer screens, boasts very high resolution and the ability to display life-like portrait quality pictures while rotating. LCDs derive their active light emitting elements from the controlled synchronization of individual pixels or groups of pixels that, viewed together, form an integral (somewhat virtual, software controlled) array of illuminating elements. Thus, the general definition of an illuminating assembly 18 is understood to apply to devices where light emitting elements 22 are connected and integral at a high density, miniature, microscopic or molecular level, such as the illuminating elements or combinations of the illuminating elements described above.

Figure 10:
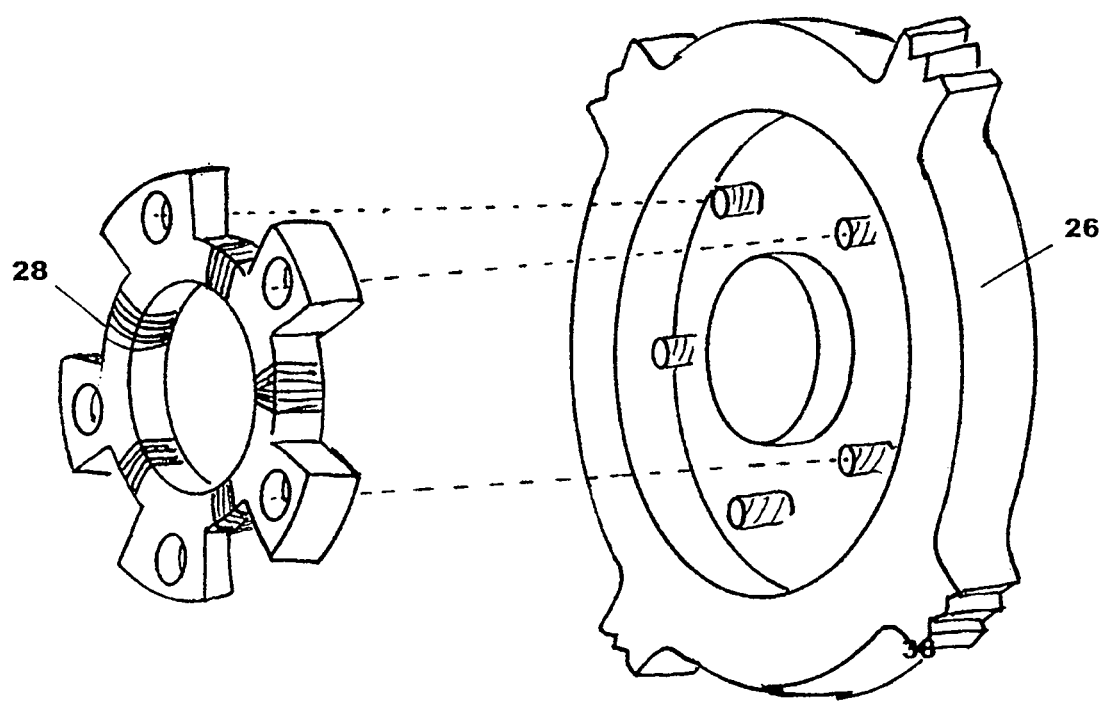
FIG. 10 is a broken partial perspective view illustrating one means for delivering power to the rotatable assembly.

Referring to FIGS. 5-10 various means of delivering power 20 to the rotating assembly 24 are illustrated. Regardless of the specific construction of the controller, position sensors, illuminating assemblies, interfaces, etc. there are many alternative and viable options for power delivery means that can provide adequate electrical power to the rotatable assembly that may be partially present on the moving (rotating) portion of the system. Batteries, solar panels, rechargeable systems and hardwired systems that employ slip-ring contacts or electrical commutator and brush assemblies are examples of some power delivery means that are well known in the art. Within the preferred embodiment a split high frequency transformer 36 is utilized. In this embodiment, the primary coil 38, in electrical communication with the vehicle battery, remains fixed to the motor vehicle 10, and the secondary coil 40 is integrated into the moving portion of the rotatable assembly 24, in this case the vehicle wheel 26. Other options may include various parasitic power generators that use micro magnetic assemblies or piezo electric devices to produce power from mechanical vibrations, harmonics or centrifugal forces (not shown). Further systems could employ a generator located inside a hub and axle assembly as shown in FIG. 10, or a free spinning generator that uses a counterweight to stabilize one part of a free spinning generator while the other part rotates with a rotatable member connected to, or part of the illuminating assembly (much like a Rolex perpetual watch winding mechanism that uses an internal rotatable counterweight to self wind an energy storage spring, but on a larger scale and adapted to generate electric power).

Referring to FIG. 10, an alternative embodiment of the instant invention is illustrated wherein a portion of the motor vehicle's drive-line and/or suspension 30 (FIG. 7) is used to transfer a magnetic field of a transformer from a fixed part of the motor vehicle to a secondary transformer coil 28 and subsequent power circuit integral to the rotating wheel. Within this embodiment the vehicle hub assembly, axle, wheel bearings, etc. act as a ferrous core for an electrical transformer to deliver power to the rotating wheel assembly.

Referring to FIGS. 1-11, the specific applications and specific uses of the rotary display system ultimately determine which variations of many possible system architectures will be employed. Likewise, the specific applications desired by the user will determine what specific visual images, text, animations or combinations are to be displayed. Consequently, specific details of the user's application will also determine system parameters, such as what colors, brightness, array size, array quantity, control systems, power supplies should be used to best match the display system design to its intended application. For example, as it is an object of the instant invention to display life-like images on a rotational display system without bending the horizontal ground plane around the axis of the display system, it is necessary to understand the operation of the prior art systems that wrap the horizontal plane around the axis of rotation. Within the prior art images or text to be displayed are scanned or programmed in a linear manner, much like a desktop scanner or photocopier moves a lighted bar across an image using a flat rectangular surface plane. At each point (pixel or dot) in the plane that contains the image or text to be displayed a digital processor assigns the corresponding X and Y coordinates of each point converting it into a simple data chain of X and Y coordinates. Essentially, the image to be displayed has each of its points graphed like it was to be reproduced on a rectangular, flat planar sheet of graph paper.

The data chain, like a bit map image, is then fed into the controller that illuminates the lighted portions of a rotating display.

Y represents the height position of a point to be displayed whereas X represents the horizontal position of a point to be displayed. Therefore, out of all XY coordinate pairs that form the image, the lowest Y coordinate is assigned to be displayed on the illuminating section closest to the axis of rotation and the highest Y coordinate is assigned to the illuminating section of the display that is closest to the perimeter.

The points on the X axis (that each pair with a respective Y coordinate) are assigned to an arbitrary predetermined starting and stopping point that correspond with one 360 degree rotation of the circular display system. In essence, the lowest X value is assigned to the degree position where the image begins in the rotational sweep and the highest X coordinate is assigned to the degree position where the image ends. In essence, an XY coordinate system is converted to display Y coordinates (as illuminated sections) only after the X coordinate set has been converted to represent angular positions on a circular system.

This allows illuminating portions of the display that correspond to the Y coordinates to illuminate at the instant that the illuminating display line crosses each point of rotation that corresponds to the matching X coordinates.

Likewise, this simple system easily converts text, images and other visuals to work properly on a rotational display by reassigning the X coordinate set to appropriate angular positions on the circle, while allowing the Y coordinate set to control which sections of the illuminating display are switched on or off, as it rotates past each point X. This also allows for easy positioning and orientation of an image to be displayed. For example, if a circle had its top most point defined as zero degrees and its bottom most point defined at 180 degrees, assuming that the circular scanning display apparatus moved in a clockwise direction, one could position an image or text on the right half of the circle by defining the lowest X value as zero degrees and the highest X value at 180 degrees. If one wished to further compress the text or image into the upper right quarter of the circle, one would assign the lowest X value to zero degrees and the highest X value to 90 degrees.

This aforementioned example of how a display scrolls images and text around a circle is exemplary only for a monochromatic system. If such a system were to have true color display capacities, it would essentially be the exact same example, in triplicate with one chain of XY coordinates for each of the primary colors to be output to a true color capable display.

In essence, the image to be scanned or digitally converted to binary data would be converted to XY coordinates just as described above, with one XY coordinate set for each color to be electronically mixed. In essence, the three coordinate data sets would be (Xred, Yred); (Xblue, Yblue) and (Xgreen, Ygreen). Likewise three separate data sets would have to be processed simultaneously in real time, fully synchronized, starting and ending at the same time without any relative processing delays between the red, blue or green data sets.

Consequently, the hardware would have to support triplicate electronic processing of each set and the rotational display system would also require tri-color separately addressable illumination sections to visually output the data. Although the electronic hardware and software is readily available to accomplish this, no such devices have yet been created. In application, it would be ideal to utilize micro sized tri-color LEDs due to their fast switching times, nearly instantaneous luminous rise and fall times, high brightness, high efficiency and point-source geometry. Likewise, one slim rotating line of such tiny, tri-color high brightness LEDs would effectively mix the primary colors at the same visual point, assuring that red, blue and green color output all occur at the same rotational angle. This would create a low cost, high quality rotational output capable of true color display.

If separate red, blue and green illumination sections are located at different points on a rotational display, output timing for each color must be appropriately shifted to maintain persistence of vision, by properly tricking the human eye into perceiving that all three colors are appearing to produce a seamless, true color image, by originating each of the primary colors from the same perceived location(s) in synchronous timing.

Take, for example, three sets of micro LEDs forming addressable illumination lines extending from about the axis to the perimeter of a rotational display system. The red LED line is arbitrarily located at the zero degree (straight up) position. The blue is at 10 degrees and the green is at 20 degrees, respectively, proceeding clockwise around the circle. Due to the relative positions, the light discharge positions for each primary color would need to be shifted. In essence, the green bar would switch it's green segments on t to represent a predetermined portion of an image to be displayed. We can call this arbitrary portion of an image "frame 1". So, the green bar would illuminate appropriate sections correlated to frame 1 at the 20 degree position in the rotation. However, the blue and red bards would have to wait until they are passing the 20 degree position to display their luminous patterns associated with frame 1. In essence, the red bar would require a shift in it's X coordinate set to add 20 degrees clockwise to it's luminous discharge timing for each frame. The blue bar would require a 10 degree forward advance on luminous discharge timing. The green would require a zero degree forward advance, meaning that the green has no shift in X coordinates (angular position) for a given frame; or simply put, the green becomes the arbitrary reference point that the other colors are referenced against the coordinate timing.

In order for any rotational display system, monochromatic or true color, to display an image across the entire circular face of a rotational display apparatus, the X and Y coordinates that define the image to be displayed in Cartesian terms must simply be converted to polar coordinates. In short, any Cartesian XY coordinate is subject to the Pythagorean theorem that models any XY coordinate as a triangle to derive the hypotenuse, or the distances from the center of the circle. In this case, the hypotenuse for a particular coordinate now defines the distances from the axis of rotation where a point, pixel or LED must illuminate at a predetermined angle to display a predetermined frame of visual output. The angle correlated to this distance is found by using the tangent function, thus indicating the numerical angle that would correlate the rotational position of the display. With the rotation angle and distance from the center known for any set of points that combine to define an image, it is possible to display an image or text across the full face of the circle. Likewise, any such image to be displayed should have its coordinate sets electronically stored in polar form.

It is also important to note that software or hardware used to convert a Cartesian image to an identical image using polar coordinates should employ software or interfacing to properly center the zero point of the Cartesian system across the approximate center of the image before polar conversion.

Failure to do this, depending on the specifics of the software developed for the rotational display, may cause an image to display off center as a result of positive integer values for any Cartesian XY coordinate set being converted to indicate a polar coordinate image in only one quadrant of a circle. Likewise, both hardware and software interfaces should have proper calibration features to properly center, tilt and properly adjust any displayed images.

Consequently, the process by which to convert digital images, text and full motion video to polar coordination for full face rotational display is not difficult. It does however require more computer programming, and subsequently more memory that an equivalent image that is displayed in wrap around mode as opposed to full face display mode. In addition, this mode is also capable of full color display if the same conversion and data processes are used for three primary colors, as described prior to be output to a capable full color rotational display device.

For example, a police vehicle 10 (FIG. 11) or ambulance may use the rotational display 12 to say "police" in a forward and/or side direction or to serve as extra emergency flashers. A large truck can display a "wide load" image on the wheel display.

A passenger car or truck can use the display as a system of virtual brake lights, directional signals, extra headlights, hazard flashers, etc. via a connection to the vehicle electric system. Such a system would use the vehicle's electric system to initiate the display of a flashing arrow image on the right wheels when the driver activates the right turn signal.

Figure 3:
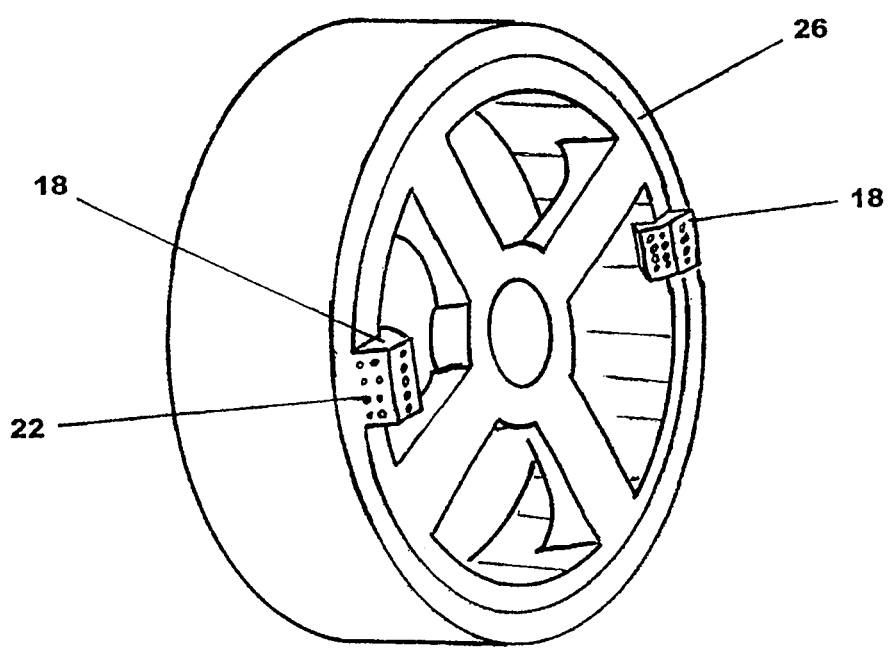
FIG. 3 is a perspective view of a motor vehicle wheel illustrating one embodiment of the rotating assembly of the instant invention for producing cylindrical or angular images.
Figure 4:
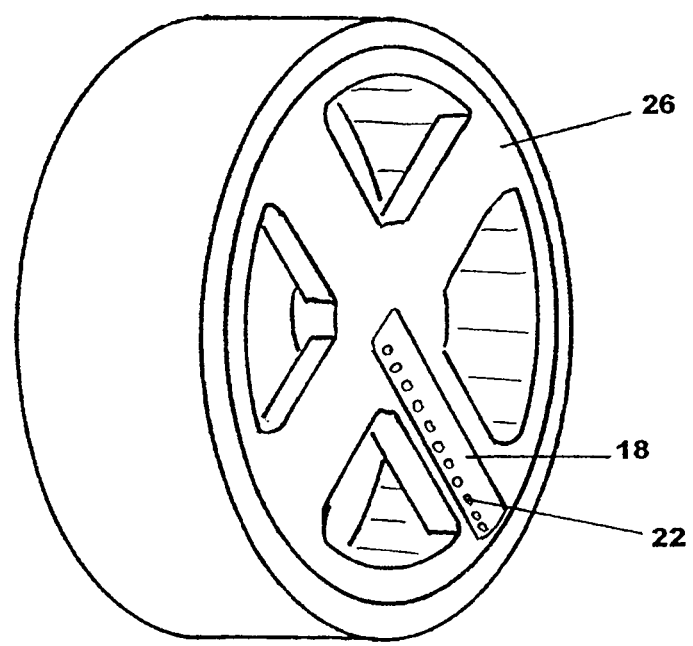
FIG. 4 is a perspective view of a motor vehicle wheel illustrating one embodiment of the instant invention utilizing and LCD illuminating assembly.
Figure 11:
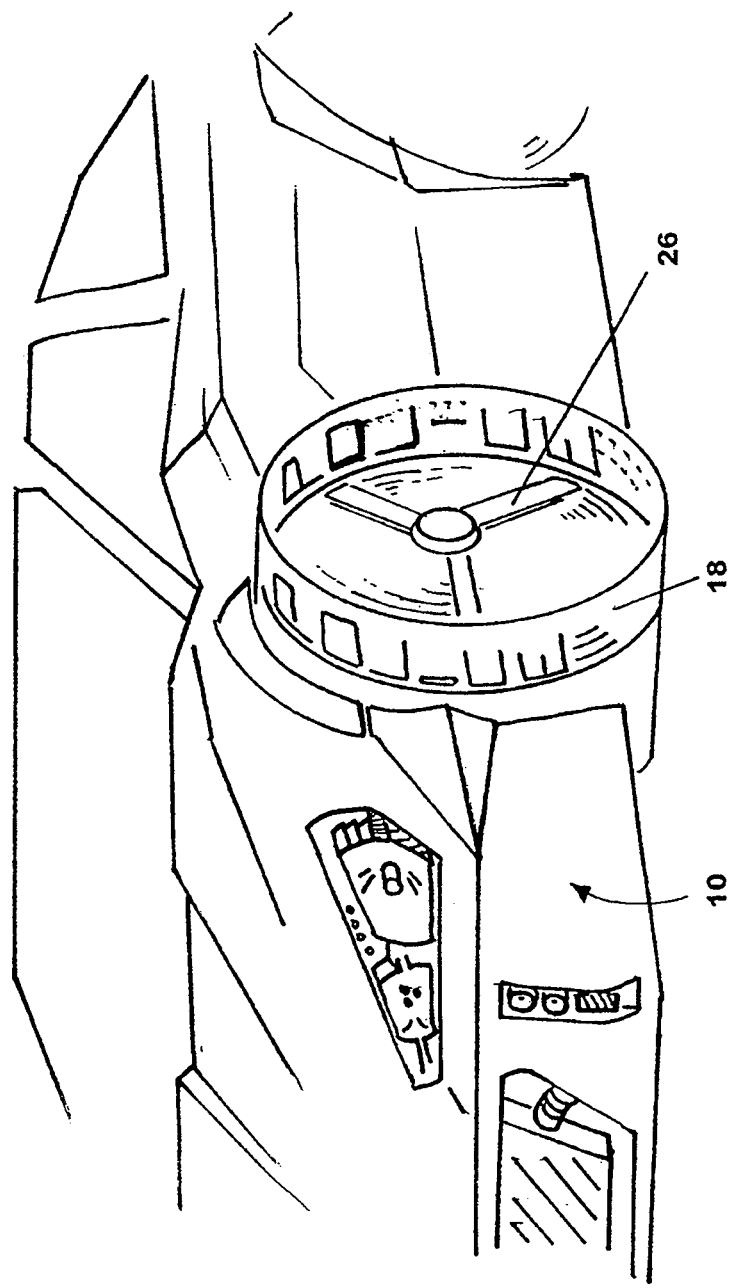
FIG. 11 is a partial perspective view illustrating the motor vehicle wheel of FIG. 3 in operation.

FIGS. 3 and 11 show unique shaped rotational display systems that have illuminating element assemblies shaped to allow virtual brake-lights that only shine backward from the rear wheels, virtual headlights that only shine forward, and directional signals that are viewable from many angles.

All aspects of the above described rotational display system can be manufactured with infinite variety. At the least expensive end of the spectrum of product offerings, an aftermarket stick-on LED strip pre-programmed with a graphic or ornamental design can be applied to a wheel with no user interface needed. An inexpensive stick-on thin PC board type car novelty could provide quick installation at low cost. A product one step higher may have a single color or multicolor aftermarket LED display strip that can be attached to the wheel, with an inexpensive battery powered human interface (like a small "credit card" sized remote control, similar to remotes included with aftermarket car stereos, located in the car) to select between a few pre-programmed graphics. More expensive models would progressively incorporate more sophisticated controllers with more advanced connectivity to external software image sources. Likewise, more expensive systems would likely incorporate brighter, higher resolution LED displays with more substantial power delivery and data delivery systems at and around the vehicle wheel assemblies. The best quality systems would support true-color capability or at least highly synchronized multi-color capabilities to display a variety of images in life like color or near life like color. The most versatile variations of the product would have multiple illuminating assemblies and LED clusters at various positions on the wheel at one or more angles, and more complex software to support their proper light discharge timing. As shown in the drawings, the LED arrays (or any light producing arrays or clusters thereof) can be contoured and positioned to project light from the rims in many specific orientations. Light projecting toward the front of the vehicle can be made into a virtual supplemental headlight, fog light, driving light or other street legal form of forward illumination. The same arrays that pass rearward facing directions as the wheels rotate can be turned into virtual brake lights. The combination of various wheel mounted arrays and light clusters can be used as highly visible street legal directional signals with the use of standard DOT approved amber color. Likewise, sophisticated displays that utilize multiple illumination assemblies, or ones directed at various angles may require software such as a plug and play style driver that identifies the wheel size, illuminating assembly positions, illuminating element colors and multi-axis illuminating assembly angles to the control system in the vehicle to allow proper display synchronization to produce clear and properly positioned images. Likewise, a multitude of software programs would provide a high degree of variety in selecting both functional and ornamental images for the vehicle wheels.

Since a traditional motor vehicle wheel or rim will not display an image while it is rotating, this is a limitation of the disclosed invention. However, if one embodiment of the disclosed system utilizes the rims as directional signals, or hazard flashers, on board hardware or software could allow all appropriately colored LEDs to illuminate or flash appropriately while the wheel is stopped, thus allowing an observer to see proper directional signals or hazard flashers disposed on the wheel. The stopped wheel would not be able to display a graphic while stopped (such as a picture of a flashing yellow arrow indicating a directional signal). However, a wheel-at-stop default sequence could take advantage of all appropriately colored LEDs while the wheel is stopped by using them for directional or hazard lights.

One alternative embodiment of the instant invention utilizes motor vehicle wheels which include "Spinners." Spinners is a slang term for freewheel rotating ornaments that are added to vehicle rims such as those disclosed in U.S. Pat. Nos. 5,290,094 and 6,663,187 the contents of which are incorporated herein in their entirety. These ornaments are typically placed on custom luxury cars and SUVs. They allow a portion of the vehicle wheel to continue turning while the car is temporarily stopped or slowed. A combination which includes spinners with the instant invention leads to a naturally advantageous combination. This would allow the continuous use of rotational display system for videos or graphics such as logos, ornaments, directional signals, brake lights, virtual headlights, etc.—even while the vehicle is stopped.

As a variation of the above embodiment, the spinners may further include activatable electric motors to rotate a portion of the rims while the car is stopped for extended periods of time, thus allowing the rotational image display to run constantly for display purposes such as a car show. Embedded software, related electrical power transmission hardware and data transmission hardware connected to the wheel display system can be used to monitor motor speed through the rotational displays' position sensor(s) and synchronization circuit(s). Motor speed or power can be adjusted or turned on/off via the controller in the vehicle. Synchronization circuits could monitor the differential rotational velocities between the rotating wheel ornament and the vehicle wheel thus adjusting motor speed to maintain full visual display capabilities throughout a range of vehicle speeds under predetermined conditions.

As a further variation of the above embodiment, a hubless spinner connected to the outer perimeter or thereabout of the wheel could be utilized. These spinners would be lighter in weight and less expensive than the present bulky ones. This embodiment could provide an option for sports car/high performance enthusiasts who do not desire traditional heavy spinners. However, a thin spinner "ring" with a few LED clusters or a continuous circle LED array disposed around the ring would give a driver the ability to have wheel mounted virtual driving lights, brake lights, directional signals and hazard flashers . . . but without the complexity of a larger spinner or a more complex wheel display system. This could be simple and utilitarian without the extra hardware or interfaces for uploading images. This would be more for the sports car enthusiast who wants the virtual signals/brakes/headlights to work while the car is stopped.

Referring to FIGS. 12-20, various embodiments of the instant invention are illustrated as being incorporated into an image display system 110 utilizing a rotatable display assembly 111 providing a plurality of axes of rotation of an illuminating assembly 112. Preferably, the axes of rotation are generally perpendicular to one another. In general, the rotational display assembly 111 displays visual information such as images including, text, numbers, symbols, animations, videos and the like. It is important to note that the component description below is a general way to explain the system and its basic components. Given modern technology, many or all of the components described herein could be combined or split in many ways and thus should not be limited to the specific component descriptions included herein. The general components of the system include a computer 114 with a memory 115, at least one controller 117 and a means 120 of power delivery to the display assembly 111. The rotatable display assembly 111 preferably has the controller 117 mounted thereto and includes the illuminating assembly 112 that moves and carries a plurality of illuminating elements 121 preferably providing discreet light sources.

Figure 12:
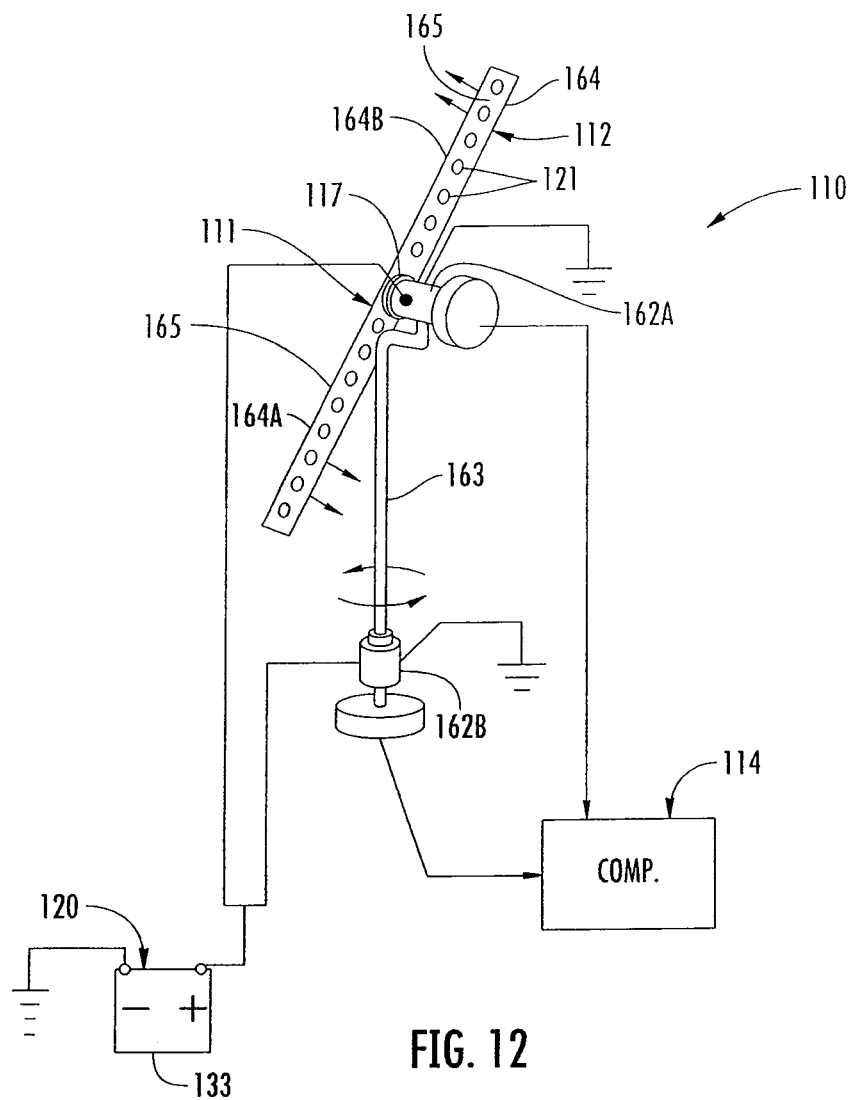
FIG. 12 is a simplified schematic view of a display system for displaying illuminated images in three dimensions.
Figure 13:
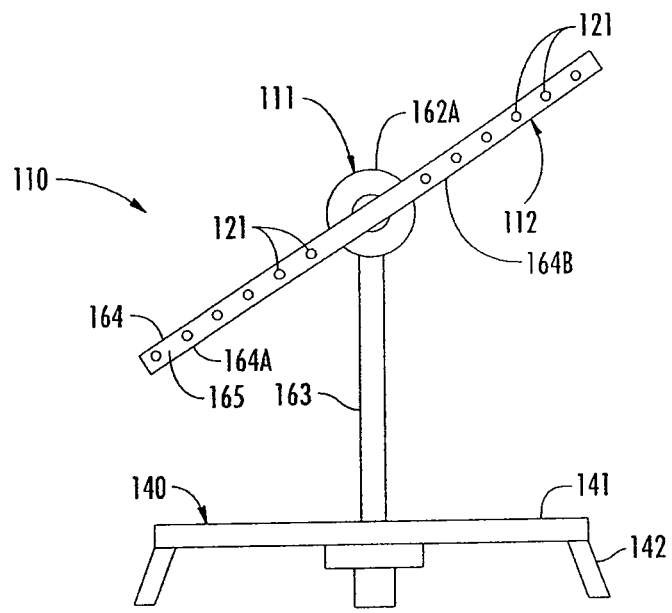
FIG. 13 is a front elevation simplified schematic view of the display system of FIG. 12.
Figure 14:
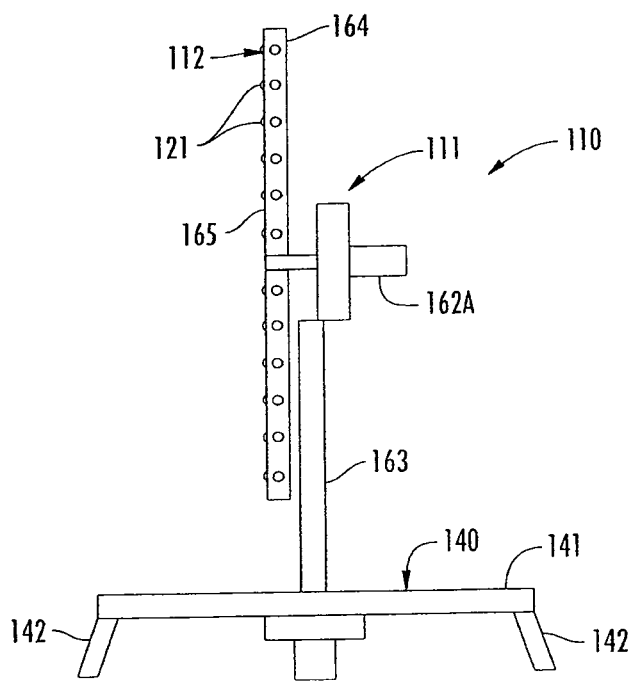
FIG. 14 is a side elevation simplified schematic view of the display system of FIG. 12.
Figure 15:
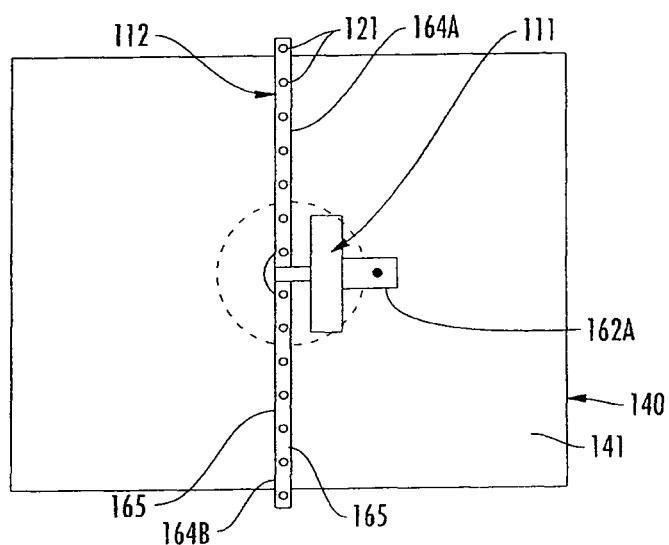
FIG. 15 is a top plan simplified schematic view of the display system of FIG. 12.

The computer 114 provides for storage and recall of information for display during operation of the display assembly 111. The information from the computer 114 is preferably wirelessly transferred to the display assembly 111 which includes the controller 117 and the illuminating assembly 112 (FIG. 12). The illuminating assembly 112 includes a plurality of illuminating elements 121 operable to present an illuminated image 119 as instructed by the computer 114. The computer 114 includes a microprocessor 122 preferably having an information transfer connector 124 that allows a consumer, user or salesperson to upload and store information regarding images, videos, logos, text, and the like for display by accepting various software file formats which may include, but should not be limited to: JPEG, BMP, AVI, Quicktime and the like. The computer 114 may also accept popular hardware methods of transferring stored digital information which may be provided from CDs, DVDs, various flash memory cards, USB ports, wireless connections, optical connections, IR ports and the like. The computer 114 may provide a high level of user selectivity and may include enhancements such as touch screens, digital pads, keyboards and suitable combinations thereof, all well known in the art, which allow a user to select which images or videos should be displayed on the display assembly 111 during operation thereof. The display system 110 may also be provided with a fixed memory set of information to display preprogrammed information.

Figure 17:
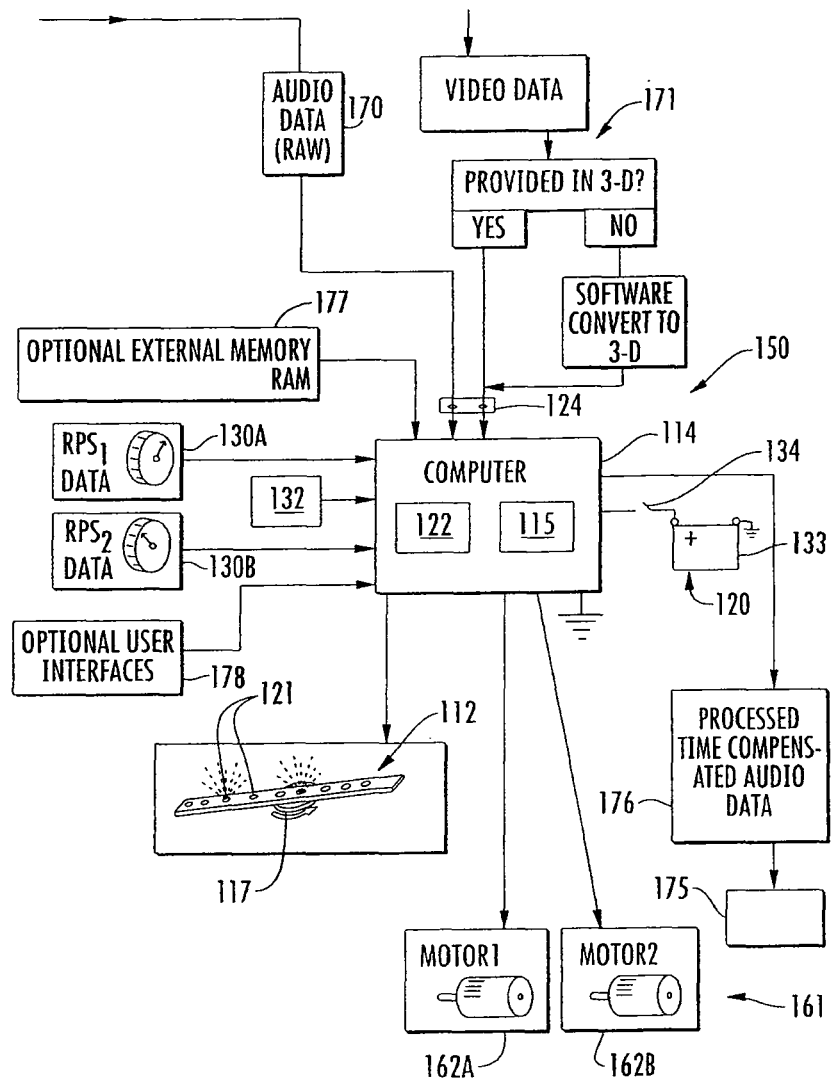
FIG. 17 is a schematic view of the display system and the control and drive components.

The computer 114 electrically communicates with the illuminating assembly 112 via the controller 117. The controller 117 is preferably positioned within or is suitably mounted to the illuminating assembly 112. The controller 117 includes circuitry suitable to accept communications from the computer wirelessly as for example via radio or optical transmission, as shown in FIG. 17. Such devices are described above. The computer 114 and/or controller 117 know the position of the illuminating assembly 112 with respect to a predetermined or reference position within the rotation. Preferably the controller 117 knows the rotational position of the illuminating assembly and preferably the position system is part of the display assembly 111. The controller 117 includes a means of synchronization that perceives the rotatable assembly 112 passing by one or more positions during rotation of the illuminating assembly 112. The simplicity, complexity or overall effectiveness of a position sensing apparatus 130 may vary depending on the application of the display system 110. The display system 110 is preferably provided with a position sensors 130 for each axis of rotation (denoted 130A and 130B for convenience). Examples of position sensing devices are described above.

The display system 110 may also be provided with one or more a tilt sensing devices 132 to indicate the degree of rotation of the display assembly 111 from plumb in one or more axes and provide signals to the controller 117 to adjust the image display so it remains positioned at a predetermined angle of rotation from horizontal or vertical.

The illuminating assembly 112 can have numerous inherent variations in size, length and resolution (resolution or definition is the number of actively switchable or addressable illuminating elements 121 per unit of area occupied by the illuminating elements 121; the higher number indicates that a higher quality image can be displayed). The illuminating assembly 112 can be made utilizing many different illuminating elements 121 as described above. Because of the rotation of the illuminating assembly 112, it provides a displayed image larger than a motionless illuminating assembly.

Referring to FIGS. 12, 17, one means 120 of delivering power to the display assembly 111 and computer 114 is illustrated. The means 120 can include one or more batteries 133 or can include normal AC current such as from a plug-in outlet. A switch 134 is provided and is operable to selectively connect the power means 120 to the other power using elements and effect their operation. The switch 134 may be any suitable switch such as a membrane snap contact switch. It may be manually operated as with a user's finger or may be configured to activate and deactivate upon relative movement of parts of the device 110. However, some applications may be able to use power from so called AC household current, since mobility may not be an issue. Regardless of the specific construction of the controller 117, position sensors 130, illuminating assembly 112, interfaces, etc. there are many alternative and viable options for power delivery means that can provide adequate electrical power to the display assembly 111 that may be partially present on the moving (rotating) portion of the device 110. Batteries, solar panels, rechargeable systems and hardwired systems are examples of usable power delivery means that are well known in the art.

FIG. 12 illustrates, in schematic form, the display system 110. The display system 110 includes a support base 140, the display assembly 111 and a control system 150. The display assembly 111 is mounted to the base 140 and is operable to effect the display of a selected image 119 using a lighted display and the control system 150 is operable to control operation of the display assembly 111.

The base 140 may be of any suitable structure and configuration and is operable to support at least the display assembly 111 during operation. It may be structured to be fixed or portable. It is preferably adapted to rest on any suitable surface, for example, a counter, table, desk or the like. It may be provided with a deck 141 and legs 142.

The display assembly 111 includes the illumination assembly 112 and a drive system 161. The drive system 161 includes at least one motor 162 and preferably a pair of motors, 162A, 162B to effect multi-axis rotation of the illumination assembly 112. As shown, the illumination assembly 112 includes an arm 164 mounted to motor 162A which in turn is mounted to a support 163. The motor 162A has an output shaft with an axis of rotation which for a direct drive of the illumination assembly 112 is the axis of rotation of the illumination assembly 112. The motor 162B is coupled to the support 163 to effect rotation of it in an axis of rotation different than the axis of rotation of the illumination assembly 112. Preferably, the axis of rotation of the support 163 is the same as that of the output shaft of the motor 162B. The two axes of rotation of the output shafts of the motors 162A, B are generally perpendicular. It is to be understood that a third axis of movement can be provided for the illumination assembly 112 limited only by interference between the illumination assembly 112 and the support 163. The third axis of movement could be an oscillating movement. The motors 162 can be any suitable motor having enough output torque and speed (angular velocity) to adequately drive the illumination assembly 112.

In the illustrate structure, the illuminating elements 121 are mounted to the arm 164. Preferably, the arm 164 includes a plurality of arm portions 164A, 164B extending in different directions, and preferably in opposite directions from the axis of rotation of the arm 164. The illustrated arm 164 is generally straight to provide a generally planar surface of rotation. It is to be understood that there can be a plurality of arms 164, a plurality of arm portions and that the arm 164 can be configured to provide surfaces of rotation of different shapes, for example conical or the like. It is also preferred that there be illuminating elements 121 exposed on various sides 165 of the arm 164 so they may be seen regardless of the degree of rotation of the support 163 about its axis of rotation.

The control system 150 includes the computer 114 and its memory 115 and microprocessor 122, position sensors 130A, B for the illuminating assembly 112 and the support 163 (providing the rotational position of the rotating illuminating assembly 112 and the support 163), the connector 124 and the controller 117. The control system 150 is operable to provide signals to the illumination assembly 112 and control energy distribution to its illuminating elements 121 to effect their on/off conditions and preferably their intensity of illumination at predetermined locations during movement of the illuminating assembly 112. The location of an illuminating element 121 is provided by its position on the illuminating assembly 112 and the position sensors 130.

The drive system 161 provides for movement of the illuminating assembly 112 preferably within a three dimensional figure or space 167 such as a sphere. The computer 114 knows the position of each of the illuminating elements 121 within the space 167 and can effect selective operation of the illuminating elements 121 at predetermined locations or coordinates within the space 167 to create a selected image 119. The image 119 may be a still image or an animated image. The computer 114 can use any suitable coordinate system, such as Cartesian coordinates, polar coordinates in space (spherical coordinates), using two angles ($\Theta,\varphi$) for azimuth and zenith and radial distance ($\rho$). Conversion between the various systems is well known.

Figure 16:
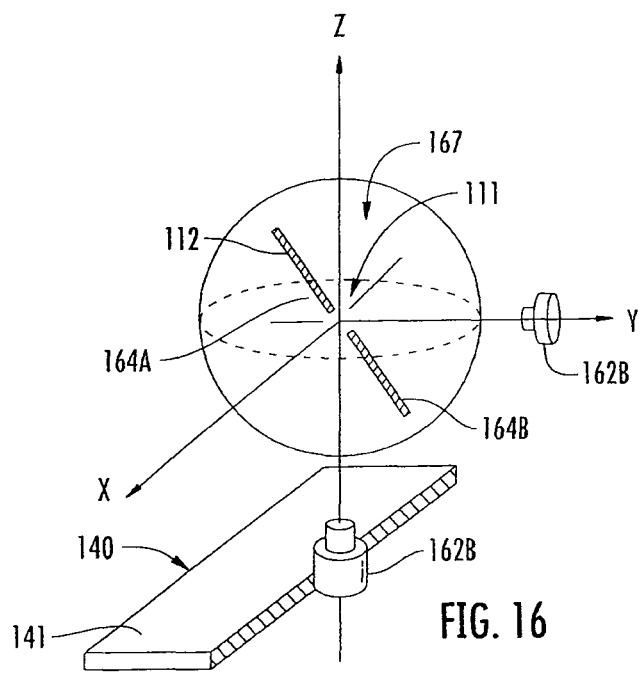
FIG. 16 is a perspective schematic view of the display system of FIG. 12 illustrating two axes of rotation.

FIGS. 12-15 illustrate the basic components of the invention. FIG. 16 shows the illuminating assembly 112 sweeping a space 167 in the form of a sphere.

FIG. 17 shows details of the control system 150. As shown, it includes the computer 114 with a microprocessor 122 and memory 115. Audio and video data inputs 170, 171, respectively, may be connected to the computer 114 via the connector 124. Non 3-D video input can be converted to 3-D by the input device 171 or may be converted by the computer 114. The position sensors 130A, B provide position data to the computer 114 preferably substantially continuously to effect timely output of data for control of the on/off of the illuminating elements 121 of the illuminating assembly 112 as described above. The computer 114 can also be operably coupled to the motors 162A, B for control of their operation as for example control of on/off and/or operating speed (angular velocity). The computer 114 can also provide audio output signals to an amplifier or directly to speakers 175 and the signals may be compressed as at 176. Optionally, the control system may also include external memory 177 and user interface(s) 178 operably coupled to the computer 114.

Figure 18:
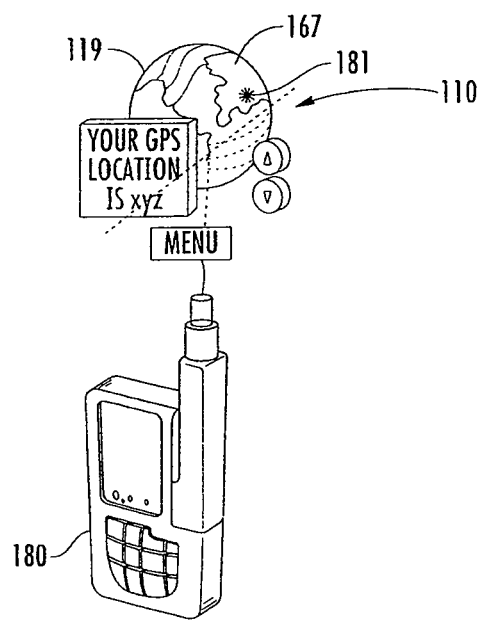
FIG. 18 is a schematic view of one form of the display system illustrating its use to show a global position.

FIG. 18 illustrates one embodiment of the invention. It includes a display system 110 that is coupled, wirelessly or by wire to a data input device such as a GPS locator 180. Coordinate information can be input to the system 110 from the locator 180. The display system 110 can be programmed to provide a 3-D image of a map or of the globe and then provide an indicator 181 to show where the GPS coordinates indicate a location.

Figure 19:
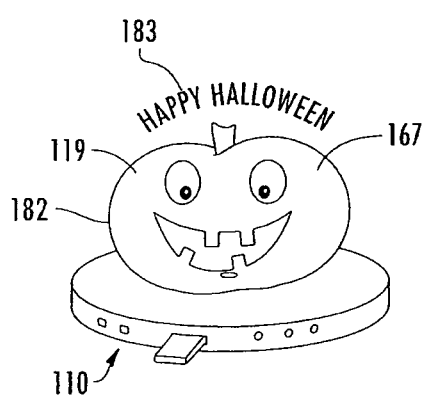
FIG. 19 is a perspective view of the display system showing a displayed image in 3-D.

FIG. 19 illustrates the display system 110 and in particular, the display assembly 111 providing a 3-D image 119 of a character 182 and accompanying text message 183. In the illustrated embodiment, the character is a jack-o-lantern and the text is HAPPY HALLOWEEN in 3-D and can be in color if desired.

Figure 20:
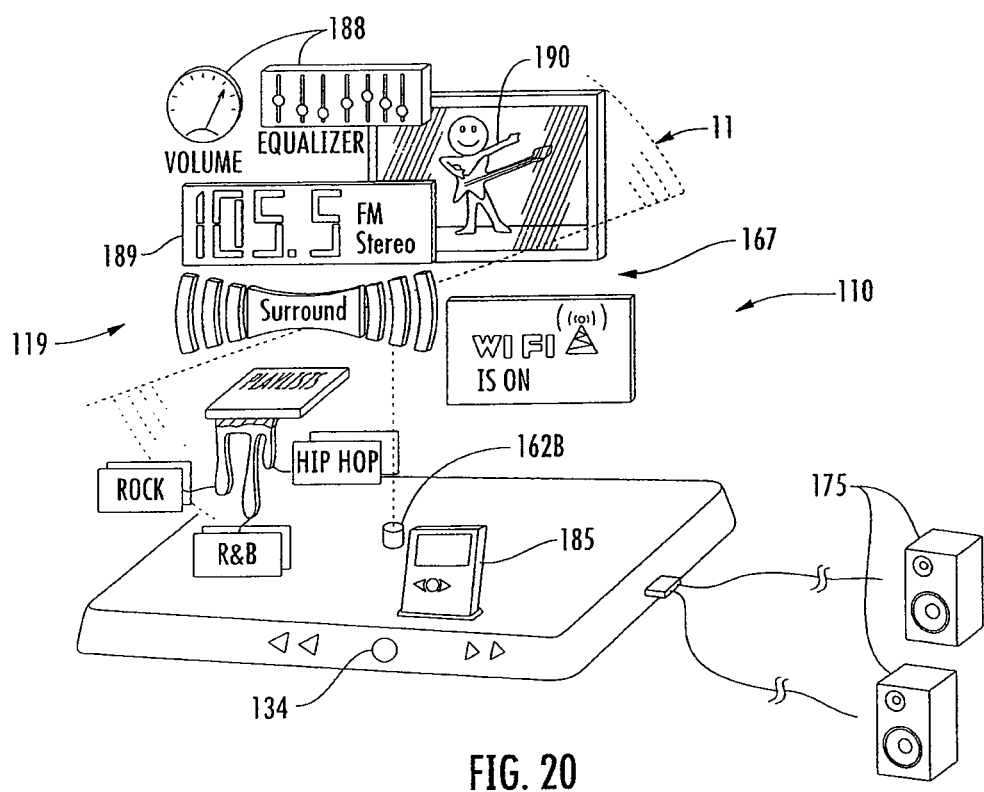
FIG. 20 is a perspective view of the display system linked to an audio system such as a broadcast radio station.

FIG. 20 illustrates an additional embodiment of the present invention. This embodiment can be interactive and receives input from one or more auxiliary data input sources. As shown, data input 185 can be received from a radio, digital storage media like a DVD player or television station or from a simulcast of television and radio. Audio output from the display system 110 can be output on speakers 175 and video is displayed by the display assembly 111. Audio output particulars 188 may be displayed along with the video. Station identification 189 may also be displayed. This data displayed may be foreground, background and separate from the subject display 190.

Referring to FIGS. 21-30, various embodiments of the instant invention are illustrated as being incorporated into panel communication devices 211 like greeting cards, books, magazines and picture frames having at least one display panel for carrying a rotatable display assembly designated generally 212. In general, the rotational display assemblies 212 display visual information such as images, text, numbers, symbols, animations, videos and the like. The general components of the system include a computer device or system 214 with a memory 215 (FIG. 28), a controller 217 and a means of power delivery 220 to the rotatable assembly 212. The rotatable assembly 212 preferably has the controller 217 mounted thereto and includes an illuminating assembly 219 that moves and carries one or more illuminating elements 221.

Figure 28:
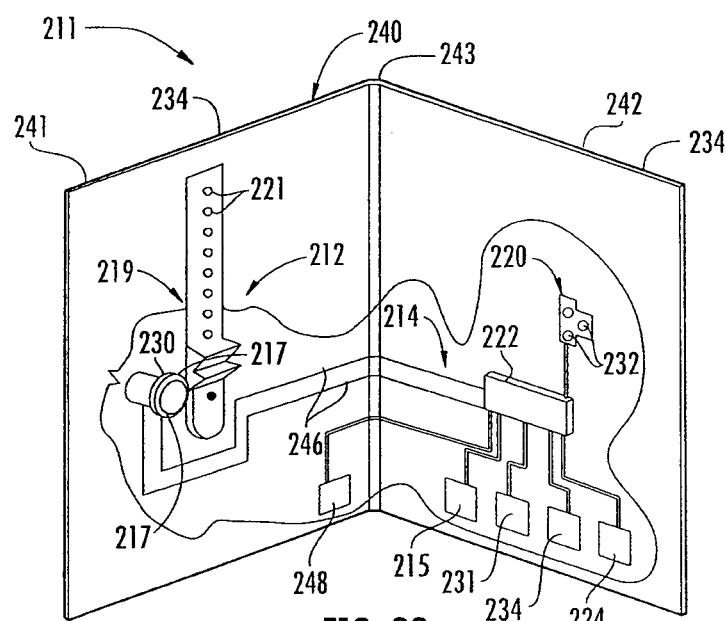
FIG. 28 is a perspective view of a greeting card with portions broken away to illustrate the mounting of various parts to the card.

The computer 214 provides for storage and recall of information for display during operation of the rotatable assembly 212. The information from the computer 214 is preferably wirelessly transferred to the rotatable assembly 212 which includes the controller 217 and the illuminating assembly 219 (FIG. 28). The computer 214 includes a microprocessor device 222 preferably having an information connector 224 that allows a consumer, user or salesperson to upload and store information regarding images, videos, logos, text, and the like for display by accepting various software file formats as described above. The computer 214 may provide a high level of user selectivity and may include enhancements as described above, which allow a user to select which images or videos should be displayed on the rotational assembly 212 during operation thereof. The communication device 211 may also be provided with a fixed memory set of information to display preprogrammed information.

The computer 214 electrically communicates with the rotatable assembly via the controller 217. The controller is preferably positioned within or is suitably mounted to the display assembly 212. The controller 217 includes circuitry suitable to accept communications from the computer wirelessly as for example via radio or optical transmission as described above, as shown in FIG. 28. A most preferred embodiment utilizes wireless micro transmitters and receivers, as described above that can at least receive data from the computer 214 as may be utilized to provide two-way communication between the computer 214 and the receiver portion of the controller 217. The controller 217 also includes circuitry capable of synchronously illuminating the illuminating elements 221 of the illuminating assembly 219, thus producing a visual output. The specific hardware and/or software utilized within the controller 217 is described above. The primary job of the controller 217 is to receive information regarding the desired display from the computer 214 and synchronously energize individual illuminating elements 221, clusters or pixels within the illuminating assembly 219 to produce one or more predetermined images or sequence of images. The controller 217 properly synchronizes the illuminating elements 222 for illumination at specific rotational positions within the rotation of the illuminating assembly 219. The computer 214 and/or controller 217 know the position of the illuminating assembly 219 with respect to a predetermined or reference position within the rotation. Preferably the controller 217 knows the rotational position of the illuminating assembly and preferably the position system is part of the rotatable assembly 212. The controller 217 includes a means of synchronization that perceives the rotatable assembly 212 passing by one or more positions during rotation of the rotatable assembly 212. The simplicity, complexity or overall effectiveness of a position sensing apparatus 230 may vary depending on the application of the device 211. Examples of readily available position sensing devices are described above.

The device 211 may also be provided with a tilt sensing device 231 to indicate the degree of rotation of a panel 234 of the device 211 from plumb and provide a signal to the controller 217 to adjust the image display so it remains positioned at a predetermined angle of rotation from horizontal of vertical irrespective of the angle of rotation of the panel from a predetermined angle in a plane parallel to the plane of rotation of the illuminating assembly 219.

The illuminating assembly 219 can have numerous variations in size, length and resolution (resolution or definition is the number of actively switchable or addressable illuminating elements 221 per unit of area occupied by the illuminating elements 221; the higher number indicates that a higher quality image can be displayed). The illuminating assembly 219 can be made utilizing many different illuminating elements 221 as described above.

Referring to FIG. 28, one means 220 of delivering power to the rotating assembly 212 is illustrated. The means 220 can include one or more batteries 232. A switch 234 is provided and is operable to selectively connect the power means 220 to the other power using elements and effect their operation. The switch 234 may be any suitable switch such as a membrane snap contact switch. It may be manually operated as with a user's finger or may be configured to activate and deactivate upon relative movement of parts of the device 211 as for example, when a greeting card is opened and closed. However, some applications may be able to use power from household current, like the picture frame shown in FIG. 30 since mobility may not be an issue. Regardless of the specific construction of the controller 217, position sensor 230, illuminating assembly 219, interfaces, etc. there are many alternative and viable options for power delivery means that can provide adequate electrical power to the rotatable assembly 212 that may be partially present on the moving (rotating) portion of the system. Batteries, solar panels, rechargeable systems and hardwired systems are examples of usable power delivery means that are well known in the art.

Figure 21:
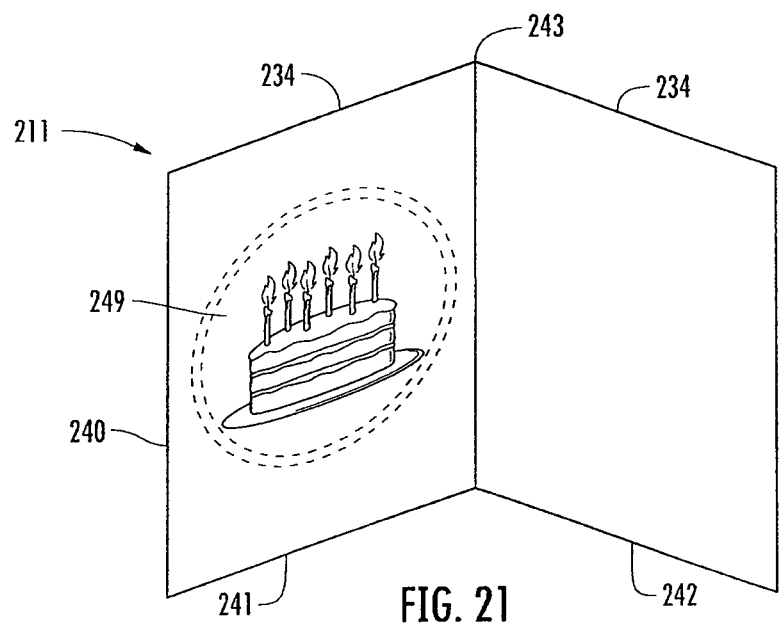
FIG. 21 is a perspective view of a panel communication device in the form of a two panel greeting card.

FIG. 21 shows one embodiment of the invention. The device 211 is in the form of a greeting card 240 having a front panel 241 and a back panel 242 connected together along a hinge fold line 243. The illustrated panels 241, 242 are shown as rectangular and planar and it is to be understood that any shape, such as round or oval, or contour may be utilized so long as they do not interfere with operation of the rotatable assembly 212. As shown in FIGS. 21, 28, the front panel 241 carries the rotation assembly 212 including the illumination assembly 219. The axis of rotation of the illumination assembly 219 is located within a non-marginal or interior portion of a panel. The rotation assembly 212 includes a motor 244 mounted to the panel 241. The illustrated embodiment has the computer 214, the power means 220, switch 234 and connector 224 mounted thereto. The power means 220 is connected to the motor 244, controller 217 and position sensor 230 by conductors 246. Information from the computer 14 can be transmitted to the controller 217 wirelessly as described above. The device 211 may also include a tilt sensor 248 that is operable to provide a signal to the computer 214 indicating a degree of tilt or rotation of one of the panel carrying the rotatable assembly 212 in a plane generally perpendicular to the axis of rotation of the illuminating assembly 219. More than one tilt sensor 248 may be provided when a plurality of illuminating assemblies 219 are utilized one for each assembly. The tilt sensor 248 and computer 214 are operable to adjust the output of the controller 217 to ensure proper orientation of a displayed image 249 irrespective of the rotational position of the panel supporting an illuminating assembly 219.

It is to be understood that the illuminating assembly 219 may be provided with a transparent cover (not shown), such as a vacuum formed dish to prevent inadvertent contact with the illuminating assembly.

Figure 22:
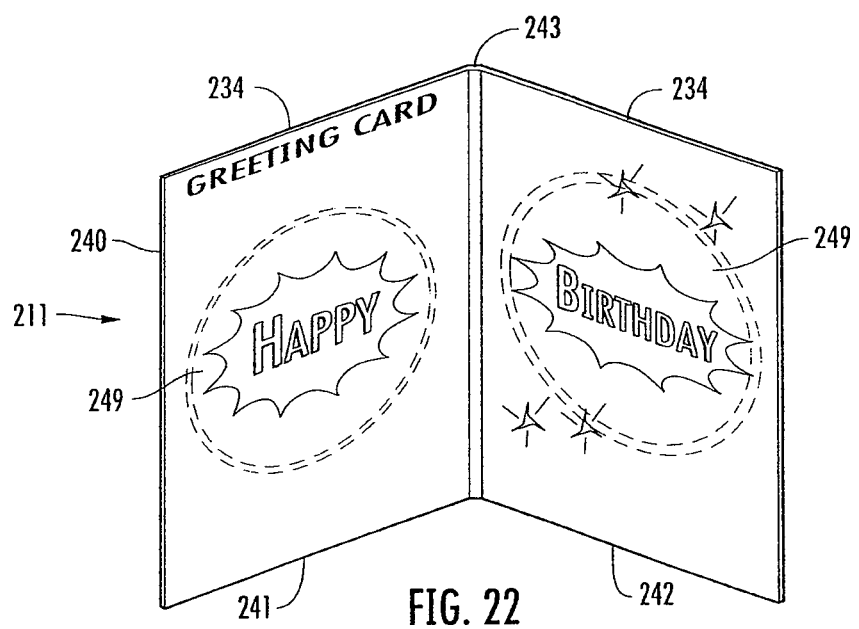
FIG. 22 is a perspective view of a greeting card similar to that shown in FIG. 21 but using a plurality image creating illuminating assemblies.

FIG. 22 illustrates an additional embodiment of the present invention. It is similar to the structure of FIGS. 21, 28, but includes a rotatable assembly 212 (not shown in FIG. 22) with each being mounted on a respective panel 241, 242 with each assembly 212 preferably being connected to the computer 214 and having its own position sensor 230 and controller 217 (not shown in FIG. 22). It will display an image 249 on each of the panels 241, 242.

Figure 26:
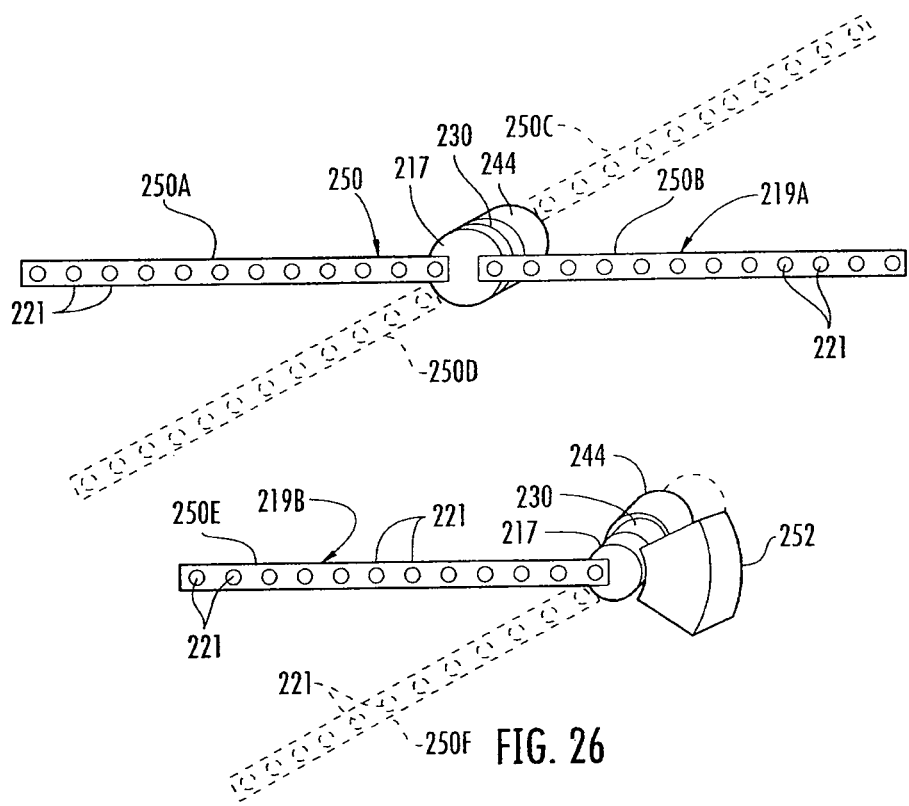
FIG. 26 is a perspective view of two alternative illuminating assemblies.

FIG. 26 illustrates two forms of illumination assembly 219. Illumination assembly 219A has an arm 250 utilizing two arm portions 250A and 250B, each carrying illuminating elements 221. The use of two arm portions 250A, 250B provides for balance during rotation. It is to be understood that any suitable number of arms or arm portions can be used in a rotatable assembly 212. In the illustrated structure, the arm 250 is configured to rotate in a plane, however, it is to be understood that a surface of rotation can be conical, either convex or concave as viewed by a user by having one or more arms 250 mounted to the motor shaft at an orientation other than perpendicular to the axis of rotation. It is also to be understood, and as seen in phantom in FIG. 26, that arms 250A, B, C, D may be positioned to provide a plurality of surfaces of rotation to provide a three dimensional (3-D) effect in the displayed image(s). A second illumination assembly 219B is shown in FIG. 26. It utilizes an arm portion 250E extending in only one direction from the axis of rotation. A counterweight 252 may be provided to balance the illumination assembly 219B during rotation. As in the above described arm assembly, second arm portion 250F may be provided to create a second image displaying surface of rotation.

Figure 23:
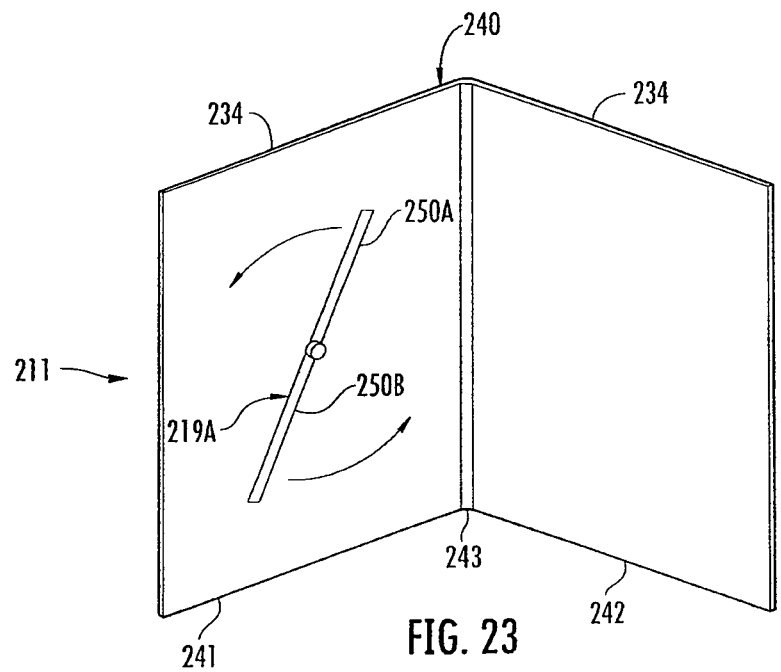
FIG. 23 is a perspective view of a greeting card as seen in FIG. 21, but having the image illuminating assembly in a stopped condition.

FIG. 23 illustrates an embodiment of the invention utilizing the illumination assembly 219A of FIG. 26 on one panel of a greeting card 240.

Figure 24:
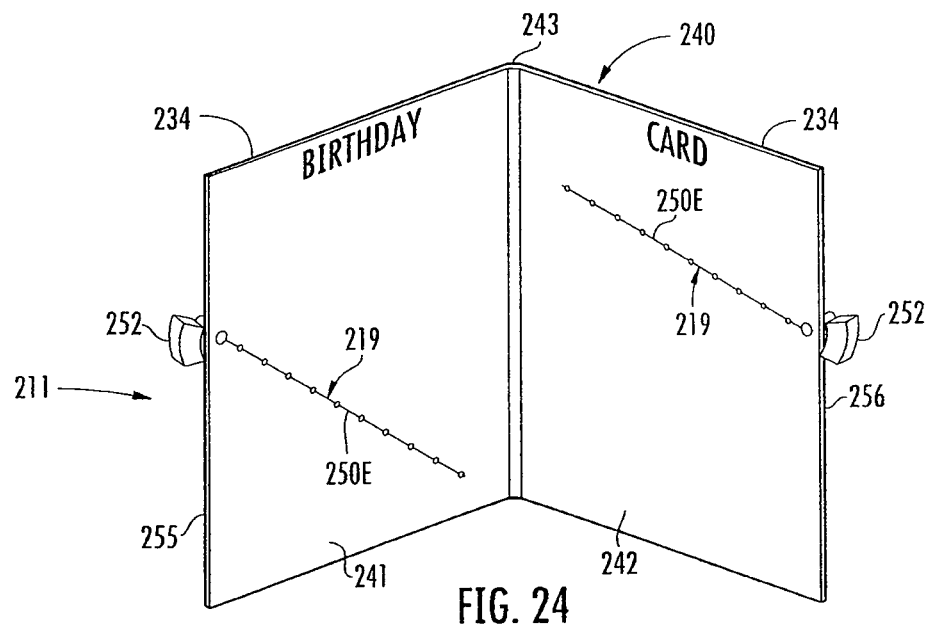
FIG. 24 is a perspective view of a greeting card but using an alternative mounting of illuminating assemblies.
Figure 25:
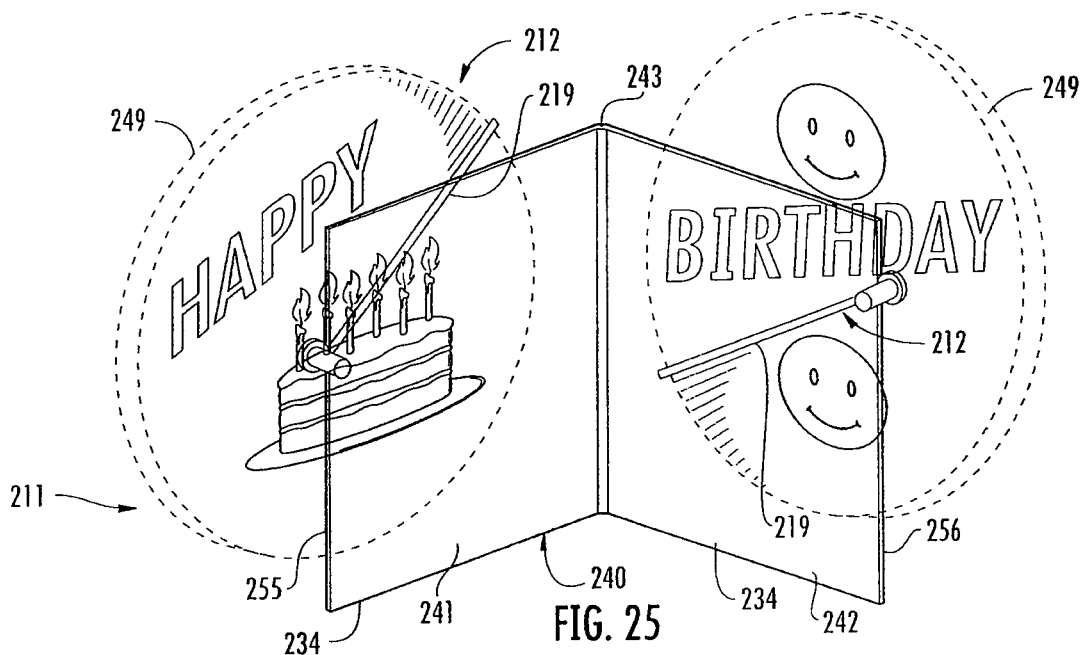
FIG. 25 is a perspective view of a greeting card showing a pair of images as displayed each in a plane generally parallel to a respective display panel.

FIGS. 24, 25 illustrate an embodiment of the invention similar to that shown in FIGS. 21, 28, but utilizes a plurality of illuminating assemblies 219 and has the illuminating assemblies mounted adjacent an edge or in an edge margin portion of a respective panel 241, 242 such as side edge margins 255, 256 respectively.

Figure 27:
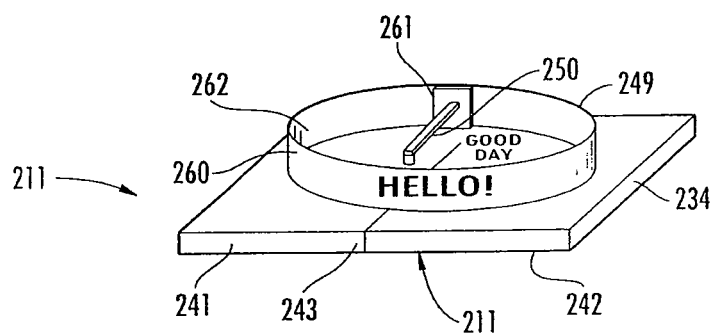
FIG. 27 is a perspective view illustrating greeting card with a rotatable scanning assembly that displays an image on a surface of rotation generally normal to the plane of rotation of the rotatable assembly.

FIG. 27 illustrates an embodiment of the invention that provides an image surface of rotation 260 generally parallel to the axis of rotation of the illuminating assembly 219. This can be accomplished by having illuminating elements 221 on an end portion 261 of an arm 250. It is to be understood that illuminating elements 221 may also be provided on the arm 250 as seen in FIG. 26 to simultaneously or selectively provide a plurality of image surfaces of rotation 260, 262.

Figure 29:
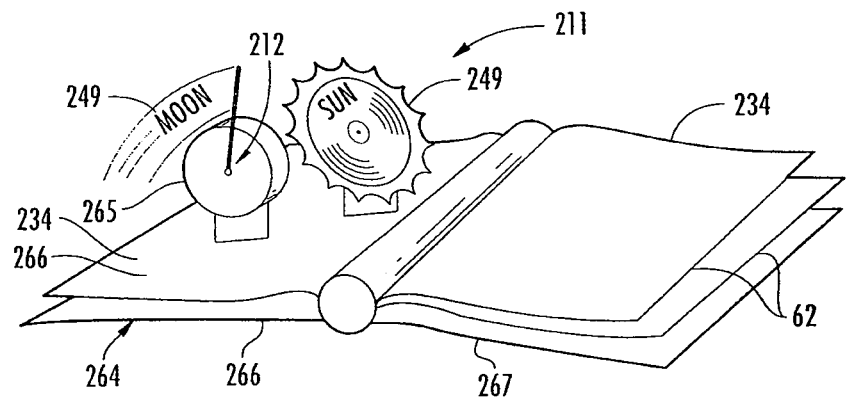
FIG. 29 is a perspective view of an alternative embodiment of a panel communication device in the form of a popup book.

FIG. 29 illustrates another embodiment of the invention utilized in a book 264. The book 264 is illustrated as a popup book having a structure 265 that can be elevated manually after opening the book or automatically pop up when exposing a page 266 for viewing. In this embodiment, the popup structure 265 has one or more rotatable assemblies 212 mounted thereto. The book 264 is also provided with a computer 214 (not shown) and other electrical components as described above to effect display one or more images 249. The rotatable assembly 212 can be activated when the popup structure 265 is in an up position. The rotatable assembly 212 can then provide an image 249 as described above. It is to be understood that the popup structure 265 can be part of either the front or back covers 267, 268 respectively. For purposes of this invention, the covers 267, 268 and the pages 266 can be considered panels as described above.

Figure 30:
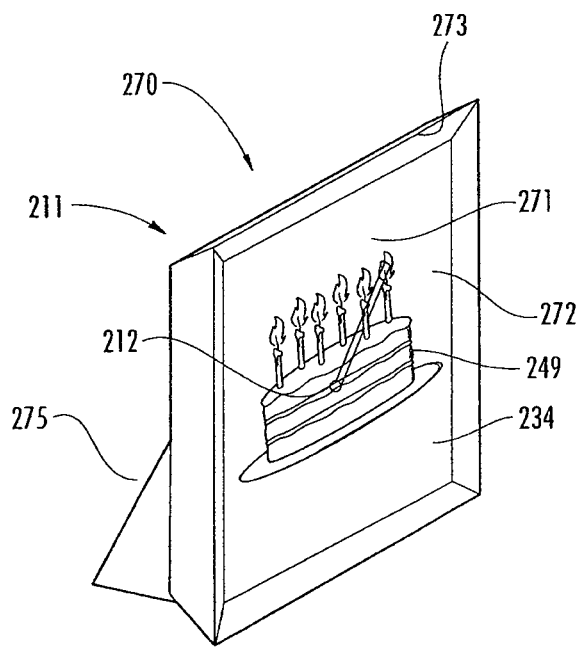
FIG. 30 is a perspective view of a second alternative embodiment of a panel communication device in the form of a free standing picture frame.

FIG. 30 illustrates still another embodiment of the present invention. This embodiment is in the form of a photograph display structure 270, like a picture frame which may or may not have an actual frame. The structure 270 includes a display panel 271 that can have the side edge portions 272 surrounded at least partially by a frame structure 273. Means may be provided for holding the structure 270 in a generally upright position if desired. Such means may include a hinged support member 275, a hook (not shown) or a wire (not shown) to cooperate with a wall hook or the like. The structure 270 is provided with a rotatable assembly 212 and associated computer 214 and other electrical components as described above to effect display of an image.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while certain forms of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A rotational display system including:
   a computer, said computer including a memory for storage and recall of data representing at least one visual image;
   a controller in wireless communication with the computer and operable to receive at least some of said data;
   a rotatable assembly for displaying an image represented by at least a portion of the data transferred from said computer to the controller, said rotatable assembly including multiple illuminating assemblies, each of said illuminating assemblies being positioned at different angles with respect to a common axis of rotation, said illuminating assemblies being operably connected to said controller, each said illuminating assembly including at least one illuminating element, said rotatable assembly including drive means operably coupled to the illuminating assembly to effect rotation thereof about a first axis of rotation;
   a support, said rotatable assembly being mounted to said support;
   a power delivery means for providing power to said rotatable assembly; and
   wherein said controller is constructed and arranged to synchronize images generated by said illuminating assemblies in a predetermined sequence to provide an image represented by at least some of the data to be displayed during rotation of the illuminating assembly, said computer being programmed to synchronize and orient a displayed image in an upright manner relative to an unbent ground plane extending across said display system.

2. The rotational display system of claim 1 wherein said computer including software constructed and arranged to allow an operator to import, manipulate, store and selectively display an image of an operator's choice with the illuminating assembly.

3. The rotational display system of claim 1 wherein said computer including hardware constructed and arranged to allow an operator to import, manipulate, store and selectively display an image of an operator's choice with the illuminating assembly.

4. The rotational display system of claim 1 wherein said controller being constructed and arranged to control illumination of said at least one illuminating element.

5. The rotational display system of claim 4 wherein said illuminating assembly including a plurality of illuminating elements, wherein each of said illuminating elements being individually controllable for illumination by said controller.

6. The rotational display system of claim 5 wherein said illuminating elements extending across said first axis of rotation, whereby a displayed image can extend across said axis of rotation.

7. The rotational display system of claim 4 wherein there being a plurality of said illuminating elements and said controller including circuitry constructed and arranged to synchronously illuminate the illuminating elements.

8. The rotational display system of claim 4 including a means of synchronization and wherein said means for synchronization is constructed and arranged to determine the relative position of said illuminating assembly with respect to a fixed position during rotation thereof.

9. The rotational display system of claim 1 wherein said rotatable assembly being constructed and arranged to display planar images.

10. The rotational display system of claim 1 wherein said rotational display system being constructed and arranged to display streaming video.

11. The rotational display system of claim 1 wherein the drive means operable to effect simultaneous rotation of the illuminating assembly about at least two axes of rotation.

12. The rotational display system of claim 11 wherein the drive means including at least two motors associated with the illuminating assembly to effect the rotation of the illuminating assembly about the at least two axes of rotation to create a 3-D image.

13. The rotational display system of claim 1 wherein the support including a display panel.

14. The rotational display system of claim 13 wherein the support including a greeting card with a said display panel.

15. The rotational display system of claim 13 wherein the support including a book with a said display panel.

16. A rotational display system including:
a computer, said computer including a memory for storage and recall of data representing at least one visual image;
a controller in wireless communication with the computer and operable to receive at least some of said data;
a rotatable assembly for displaying an image represented by at least a portion of the data transferred from said computer to the controller, said rotatable assembly including multiple illuminating assemblies, each of said illuminating assemblies being positioned at different angles with respect to a common axis of rotation, said illuminating assemblies being operably connected to said controller, each said illuminating assembly including at least one illuminating element, said rotatable assembly including drive means operably coupled to the illuminating assembly to effect rotation thereof about a first axis of rotation;
a support, said rotatable assembly being mounted to said support;
a power delivery means for providing power to said rotatable assembly; and
wherein said controller is constructed and arranged to synchronize images generated by said illuminating assemblies in a predetermined sequence to provide an image represented by at least some of the data may be displayed during rotation of the illuminating assembly, said computer being programmed to synchronize and orient a displayed cylindrical image.

17. A rotational display system including:
a computer, said computer including a memory for storage and recall of data representing at least one visual image;
a controller in wireless communication with the computer and operable to receive at least some of said data;
a rotatable assembly for displaying an image represented by at least a portion of the data transferred from said computer to the controller, said rotatable assembly including multiple illuminating assemblies, each of said illuminating assemblies being positioned at different angles with respect to a common axis of rotation, said illuminating assemblies being operably connected to said controller, each said illuminating assembly including at least one illuminating element, said rotatable assembly including drive means operably coupled to the illuminating assembly to effect rotation thereof about a first axis of rotation;
a support, said rotatable assembly being mounted to said support;
a power delivery means for providing power to said rotatable assembly; and
wherein said controller is constructed and arranged to synchronize images generated by said illuminating assemblies in a predetermined sequence to provide an image represented by at least some of the data may be displayed during rotation of the illuminating assembly, said computer being programmed to synchronize and orient a displayed three dimensional image.

18. A display system operable for displaying an illuminated image in 3-D, the system comprising:
a base;
a display assembly mounted to the base and including at least one illuminating assembly having a plurality of illuminating elements and a drive assembly operably associated with the illuminating assembly and operable to simultaneously rotate the illuminating assembly about at least two axes of rotation, said drive assembly including at least one motor and the illumination assembly having a plurality of discrete light sources thereon and movable therewith;
a control system including a rotation position sensor operably associated with at least one of the motor and the illumination assembly and operable to provide a rotation position signal for the illumination assembly in at least one of the axes of rotation and including a controller operably coupled to a computer device having a memory device, said controller being connected to the illumination assembly and the position sensor and operable to receive the rotation position signal and selectively activate and deactivate the lights sources in accordance with programmed instructions in the memory device during movement of at least a portion of the illumination assembly by the motor, said computer device being programmed to illuminate selected said light sources at preselected rotational positions of the light sources and provide at least one visual image utilizing persistence of vision over an area greater than that covered by a motionless said illumination assembly;
a power source connected to the motor, illumination assembly and control system; and
a switch device connected to the power source and operable to selectively energize the motor, control system and illumination assembly.

19. The display system of claim 18 wherein the illumination assembly including an arm, said arm having a plurality of spaced apart said light sources along the arm.

20. The display system of claim 19 wherein the light sources including LED's.

21. The display system of claim 19 wherein the light sources being operable to provide an output of a plurality of different colors.

22. The display system of claim 19 wherein the visual image being substantially immovable relative to the display device during display of the image.

23. The display system of claim 19 wherein there being a plurality of said arms each extending in a different direction from a center of rotation of the illuminating assembly.

24. The display system of claim 19 wherein the arm being movable independently about two axes of rotation.

25. The display system of claim 24 wherein a displayed image lying in a sphere.

26. The display system of claim 18 wherein the display system being coupled to an audio system.

27. The display system of claim 18 wherein the computer having an input connector to permit image data input by a user of the device.

28. The display system of claim 18 wherein the computer having image data prior to receipt by a user.

29. The display system of claim 18 wherein the computer having an input connector to permit inputting image data at a point of sale.

30. The display system of claim 18 wherein the illumination assembly being coupled to a first motor having a first output shaft oriented for rotation about a first axis of rotation and carried by a support and the support being coupled to a second motor having a second output shaft oriented for rotating the support about a second axis of rotation that is different from the first axis of rotation.

31. The display system of claim 30 wherein the first and second axes of rotation being generally normal to one another.

32. The display system of claim 31 wherein a displayed image lying in a sphere.

33. The display system of claim 32 wherein the illumination assembly including an arm, said arm having a plurality of spaced apart said light sources along the arm.

34. The display system of claim 33 wherein the arm having a plurality of arm portions extending in different directions from the axis of rotation of the arm.

35. The display system of claim 34 wherein at least one of the arm portions being generally perpendicular to the axis of rotation of the arm.

* * * * *